US009928651B2

(12) United States Patent
Mariappan

(10) Patent No.: US 9,928,651 B2
(45) Date of Patent: Mar. 27, 2018

(54) OVERLAID VIRTUAL PLAYGROUND AND OVERLAID VIRTUAL INFORMATION DELIVERY PLATFORM FOR RESTAURANTS, CATERING BUSINESSES AND OTHER BUSINESSES USING MENU CARDS, PIZZA BOXES, SALT AND PEPPER SHAKERS, AND OTHER OBJECTS

(71) Applicant: Mahesh Babu Mariappan, Chennai (IN)

(72) Inventor: Mahesh Babu Mariappan, Chennai (IN)

( * ) Notice: Subject to any disclaimer, the term of this patent is extended or adjusted under 35 U.S.C. 154(b) by 612 days.

(21) Appl. No.: 13/771,229

(22) Filed: Feb. 20, 2013

(65) Prior Publication Data

US 2013/0222367 A1 Aug. 29, 2013

Related U.S. Application Data

(60) Provisional application No. 61/601,024, filed on Feb. 21, 2012.

(51) Int. Cl.
*G06T 19/00* (2011.01)
*G06Q 30/02* (2012.01)

(52) U.S. Cl.
CPC ........... *G06T 19/006* (2013.01); *G06Q 30/02* (2013.01)

(58) Field of Classification Search
USPC ..... 705/14.1, 15, 319, 346; 725/86; 434/350
See application file for complete search history.

(56) References Cited

U.S. PATENT DOCUMENTS

| 6,690,402 B1 | 2/2004 | Waller et al. |
| 2006/0018209 A1 | 1/2006 | Drakoulis et al. |
| 2006/0267952 A1 | 11/2006 | Alcorn |
| 2007/0162350 A1* | 7/2007 | Friedman .......... G06F 17/30879 705/346 |

(Continued)

OTHER PUBLICATIONS

STIC NPL Search (Year: 2016).*

*Primary Examiner* — Scott A Zare
*Assistant Examiner* — Reva R Danzig
(74) *Attorney, Agent, or Firm* — Carter, DeLuca, Farrell & Schmidt, LLP

(57) ABSTRACT

The present invention obviates the need for restaurants to install expensive physical hardware such as swings, slides, etc that consume valuable property real-estate, to provide playing entertainment to customers, by constructing a virtual playground out of objects typically found in restaurants such as salt and pepper shakers, napkin dispensers, spoons, forks, plates, glasses, menu cards, pizza-boxes, etc. The present invention virtualizes these real-world objects and uses the virtualized characters to populate a virtual playground that is overlaid on top of real-world objects. This virtual playground allows users to manipulate virtual characters facilitating gameplay and entertainment.

The present invention also transforms conventional printed restaurant menu cards into a platform for rich multimedia information delivery/consumption by superimposing/overlaying real-world printed menu cards with virtual multimedia contents such as video, audio, graphics, graphical characters in 2-dimension or 3-dimension, animation, etc that can be interacted with, providing a rich infotainment experience for customers.

66 Claims, 11 Drawing Sheets

(56) References Cited

U.S. PATENT DOCUMENTS

| | | | |
|---|---|---|---|
| 2008/0022328 A1* | 1/2008 | Miller | H04N 21/41415 725/86 |
| 2008/0172290 A1* | 7/2008 | Masucci | G06Q 30/02 705/14.1 |
| 2010/0097445 A1 | 4/2010 | Hirama et al. | |
| 2010/0106607 A1 | 4/2010 | Riddiford et al. | |
| 2011/0236872 A1* | 9/2011 | Taylor | G06Q 10/06 434/350 |
| 2013/0036064 A1* | 2/2013 | Osvald | G06O 30/0209 705/319 |

* cited by examiner

ENTRÉES

Cheese Burger ------------16.29

Fried Rice ------------17.59

Veg. Sandwich ------------12.79

Noodles ------------11.79

Spinach Lasagna ------------16.59

FIG. 5

OVERLAID VIRTUAL PLAYGROUND AND OVERLAID VIRTUAL INFORMATION DELIVERY PLATFORM FOR RESTAURANTS, CATERING BUSINESSES AND OTHER BUSINESSES USING MENU CARDS, PIZZA BOXES, SALT AND PEPPER SHAKERS, AND OTHER OBJECTS

CROSS-REFERENCE TO RELATED APPLICATIONS

Claim of Priority

The present application is a nonprovisional US patent application that corresponds to and claims the benefit of the U.S. patent provisional application, application No. 61/601,024, confirmation number 1070, EFS ID 12115043, filed by Mahesh Babu Mariappan on Feb. 21, 2012, titled "Augmented Reality Playground for Restaurants Using Menu Cards and Other Objects on the Restaurant Table," the entire contents of which are hereby incorporated by reference herein. The present invention therefore claims the priority date of Feb. 21, 2012.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF THE INVENTION

The present invention is in the field of restaurant infotainment. The present invention fundamentally redefines the entertainment and information consumption experience of restaurant customers.

BACKGROUND OF THE INVENTION

Firstly, conventionally, restaurants that want to provide playing entertainment experience for customers need to install physical hardware such as expensive playground equipment like swings, slides, etc or at the least some table top rod soccer games that consume valuable physical space and real estate. There is a constraint on the real estate space that can be allocated by restaurants for installing such gaming equipment and hardware. There is also a limit on the number of customers who can simultaneously play those games because of the limitation on the number of units that can be installed within limited space.

Secondly, printed material such as menu cards, used by restaurants and other catering businesses for providing information, are typically bland, boring and prehistoric. Besides, printed menu cards can deliver only so much information. In other words, there is also a constraint on paper real estate in terms of the limited printing space available on restaurant menu cards.

SUMMARY OF THE INVENTION

The present invention addresses the first issue mentioned in the above section, by obviating the need for restaurants to install expensive physical hardware such as swings, slides, etc, that consume valuable property real-estate, by constructing a virtual playground out of objects typically found in restaurants such as salt and pepper shakers, napkin dispensers, spoons, forks, plates, glasses, menu cards, pizza boxes, etc. The present invention virtualizes these real-world objects and uses the virtualized characters to populate a virtual playground that is overlaid on top of real-world objects. This virtual playground then performs the functions of real-world physical hardware playgrounds from the point of view of entertaining and engaging the users, by allowing the users to manipulate virtual characters facilitating gameplay and entertainment.

The present invention addresses the second issue mentioned in the above section, by transforming a typically bland, boring and prehistoric conventional printed menu card used in restaurants into a platform for rich multimedia information delivery/consumption by superimposing/overlaying the real-world printed menu card with virtual multimedia contents such as video, audio, graphics, graphical characters in 2-dimension or 3-dimension, animation, etc that can be interacted with, providing a rich infotainment experience for customers.

BRIEF DESCRIPTION OF THE DRAWINGS

FIG. 5 presents a typical real-world restaurant menu card printed on paper material.

DETAILED DESCRIPTION OF THE INVENTION

Figure 1:
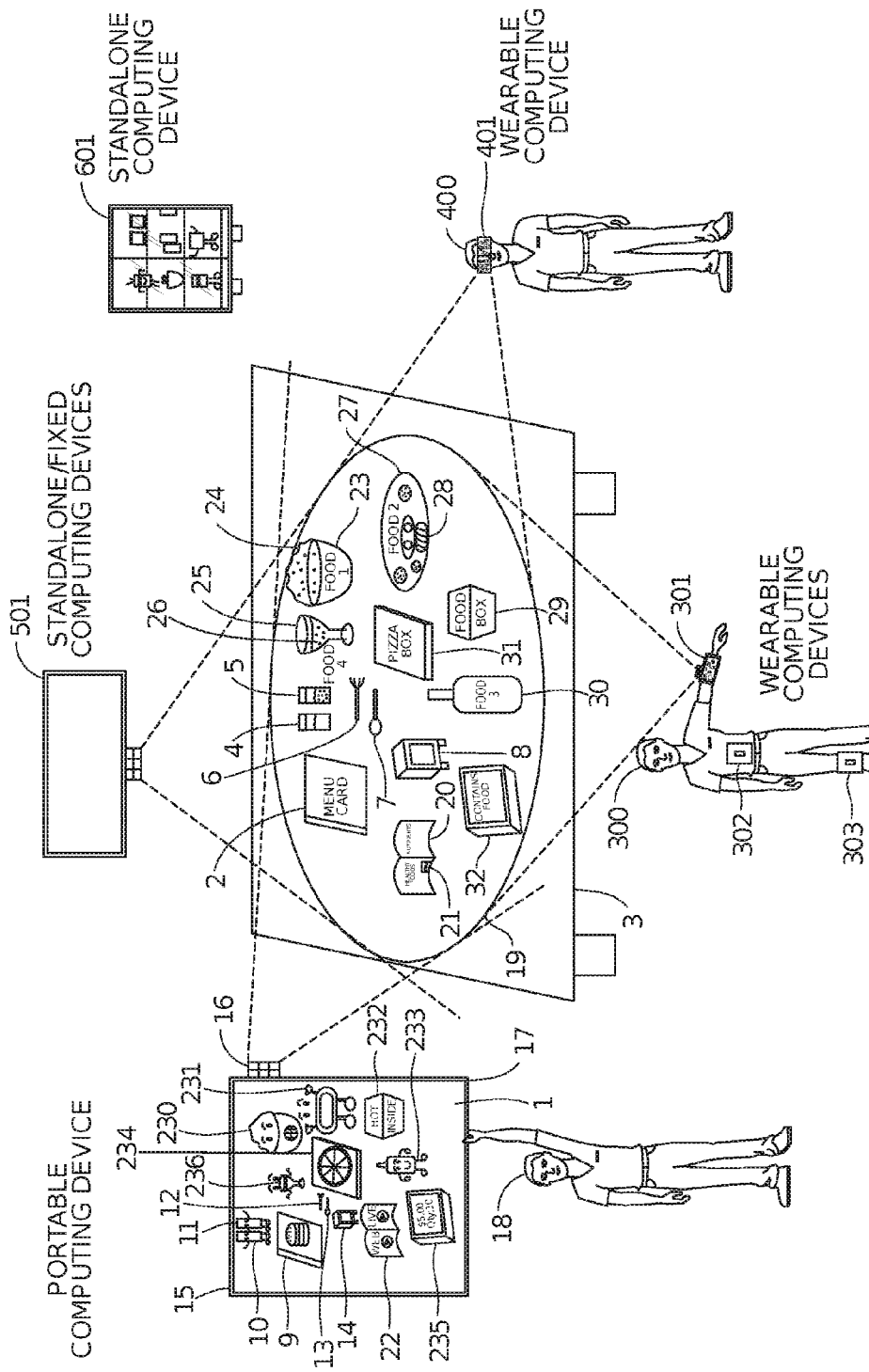
FIG. 1 shows, according to some aspects of the present disclosure, a scenario where multiple users are interacting with various physical food items, physical food containers, physical objects, and their corresponding virtual game character toys, through different kinds of portable, handheld, standalone or wearable computing devices equipped with means to realize an overlaid virtual playground.

Referring now to the invention in more detail, in FIG. 1, there is shown, according to some aspects of the present disclosure, an overlaid virtual playground 1 constructed using physical objects such as a restaurant's menu card 2, salt shaker 4, pepper shaker 5, fork 6, spoon 7, napkin dispenser 8 and health news magazine 20 containing printed photograph 21, becoming virtual game characters 9, 10, 11, 12, 13, 14 and 22, respectively. The real world objects 2, 4, 5, 6, 7, 8, 20 on a table 3 are viewed through a mobile computing device 15's one or more video cameras/imaging system/sensory system 16. 19 represents the real-world camera/imaging system/sensory system 16's view range or sensing range.

FIG. 1 also shows physical food items or physical food containers transforming into Food Game Toys. 23 represents physical food container containing physical Food 1 denoted by 24. 25 represents physical liquid/beverage container containing physical liquid Food 4 denoted by 26. 27 represents physical dining ware containing physical Food 2 denoted by 28. 29 represents a physical food box or packaging. 30 represents physical bottle containing physical liquid Food 3. 31 represents a physical pizza box. 32 represents a food processing equipment/food storage equipment/food vending equipment that contains food. 230, 231, 232, 233, 234, 235, 236 represent Food Game Toys created out of physical food items/physical food containers that are computationally recognized by the invention. The mobile device 15 allows a user 18 to interact with these virtual game characters/virtual objects by touching and manipulating them through the mobile device 15's touch screen display device 17. Alternatively, the user 18 can physically manipulate the real-world objects 2, 4, 5, 6, 7, 8, 20, 23, 24, 25, 26, 27, 28, 29, 30, 31, 32 by either moving them around, or making them touch each other, or changing their relative position, orientation, etc., or forming groups of the objects. 300 represents another user using wearable computing devices 301, 302 and 303 worn on or near the limbs or body. 400 represents yet another user using wearable computing device 401 worn on the head or face. 501 and 601 represent standalone/fixed computing devices. These portable, handheld, standalone or wearable computing devices are equipped with means to realize the overlaid virtual playground, such as imaging system, sensor system, input system, output system, display mechanism, together with computing capabilities.

Figure 2:
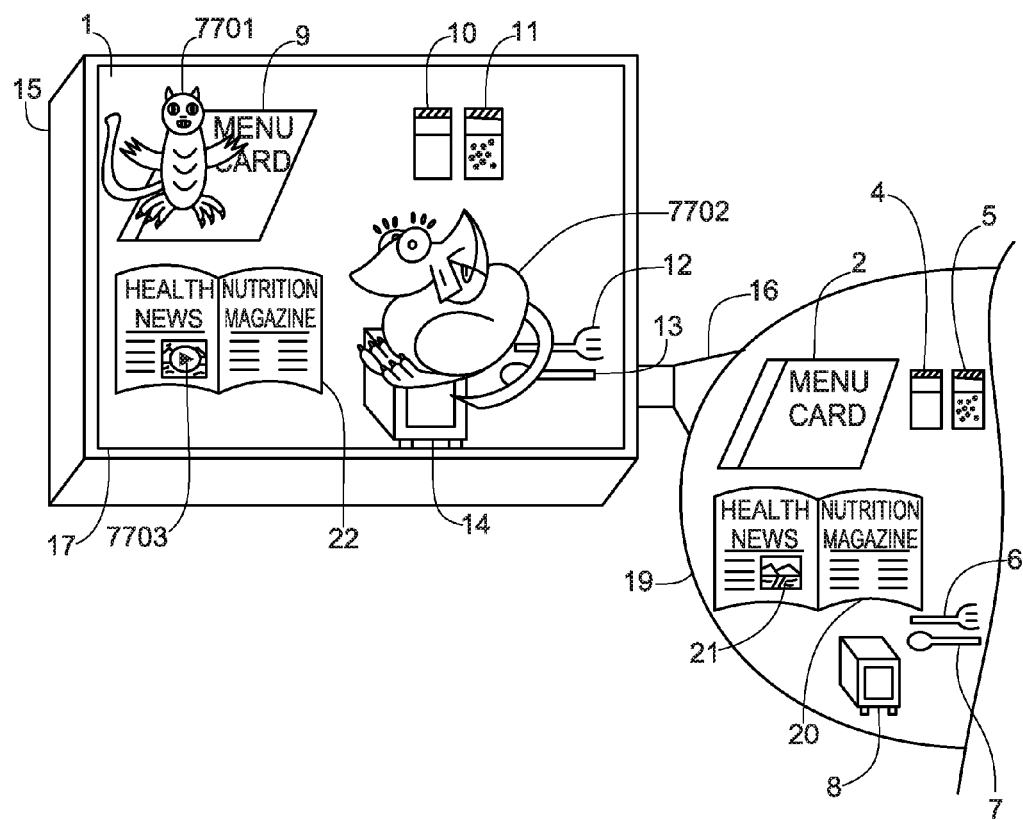
FIG. 2 presents a view of virtual objects overlaid on top of real world objects.

FIG. 2 shows the virtual playground 1 as seen through the user's mobile device 15's video camera 16. In addition to the virtualized versions of the real world objects 2, 4, S, 6, 7, 8, 20 (and other real world objects that can be virtualized or seen through the video-camera 16 of the mobile device 15), the virtual playground is also populated with truly virtual characters such as the hungry truly virtual cat 7701 standing on the front cover of the virtualized menu card 9, the freaked out truly virtual rat 7702 sitting on top of the virtualized napkin dispenser 14, the truly virtual video graphic multimedia content 7703 overlaid on top of the virtualized heath news nutrition magazine 22. These truly virtual characters 1 truly virtual objects 7701, 7702 and 7703 have no real-world existence, but are populated in the virtual playground to create a rich multimedia gaming and multimedia information consumption experience to the users.

Figure 3:
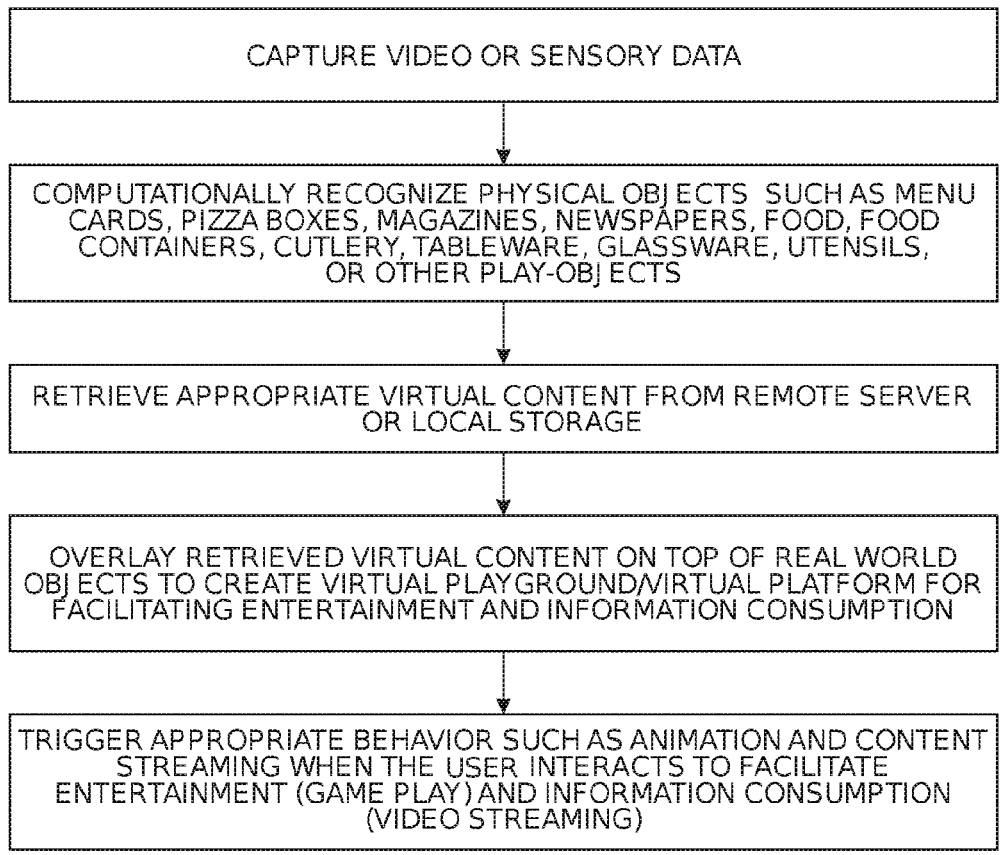
FIG. 3 presents the overlaid virtual playground creation pipeline that saves property real estate space.

FIG. 3 presents the virtual playground creation pipeline that saves property real estate space. Video of the restaurant table is captured through mobile device 15's video camera 16. The captured video is processed by the mobile device 15. Recognition of the objects on the restaurant table such as menu card, salt and pepper shakers, napkin dispenser, health magazine, newspaper, etc takes place. Appropriate virtual content is retrieved from remote servers or local storage if the content is locally available. The retrieved virtual content is overlaid on top of the real world objects to create virtual playground/virtual platform for facilitating rich multimedia entertainment and information consumption experience to the users. When the user interacts, appropriate behavior such as animation and content streaming from the remote server takes place to facilitate continued entertainment (gameplay) and information consumption (video streaming).

The creation of the virtual playground overlaid on top of the real-world objects obviate the need to install expensive physical playground equipment such as swings, slides, etc, thereby, saving precious property real estate space.

Figure 4:
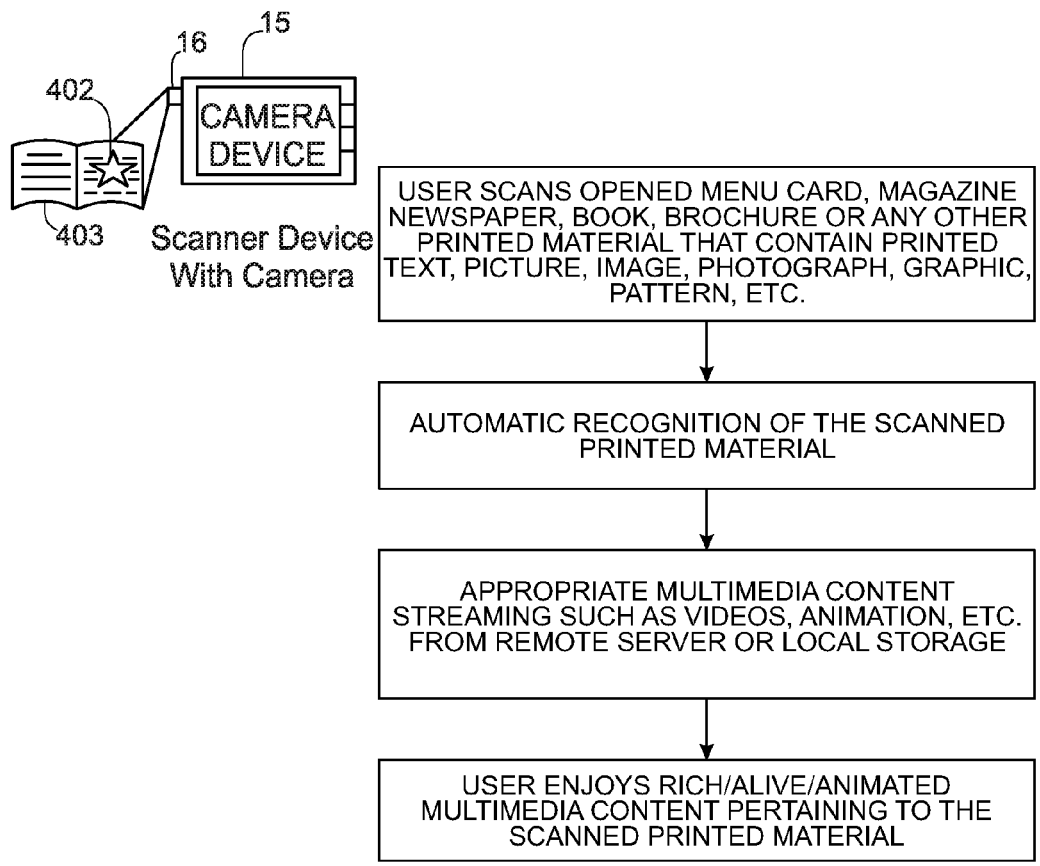
FIG. 4 presents the remote information delivery pipeline that saves space on printed material such as paper.

FIG. 4 presents the remote information delivery pipeline that saves space on printed material such as paper. The user scans opened menu card, health newspaper, nutrition magazine, book, brochure, flyers, or any other printed material such as 403 that contain printed text, picture, image, photograph, graphic, pattern, etc such as 402, using the mobile device 15's video camera 16. Automatic recognition of the scanned printed material takes place, and appropriate multimedia content such as video, audio, animation, hyperlinks, etc is streamed from remote server or fetched from local storage if the required content is locally available. The user 18, enjoys rich/alive/animated multimedia content pertaining to the scanned printed material, overlaid on top of real world printed material. The present invention thereby saves space on printed material such as paper.

FIG. 5 presents a typical real-world restaurant menu card printed on paper material. This printed menu card can deliver only so much information. In other words, there 15a constraint on paper real estate in terms of the limited printing space available on paper.

Figure 6:
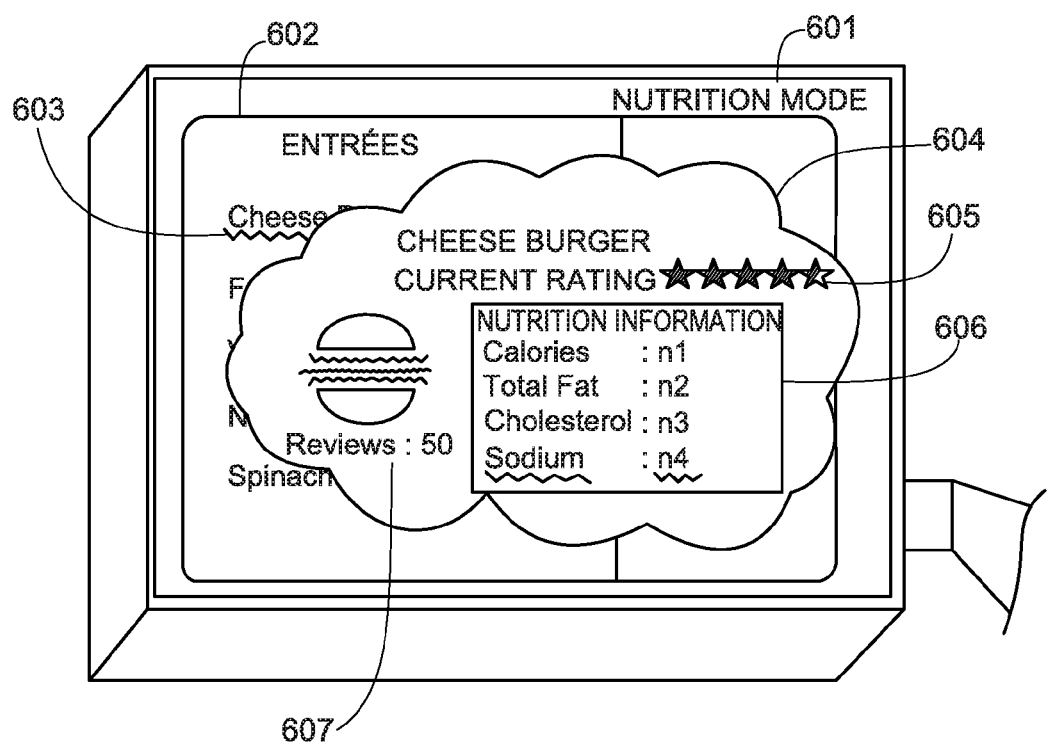
FIG. 6 shows an opened real-world menu card as seen through the invention, overlaying virtual content on real-world printed material. The virtual content in this case is nutrition information.

As it can be clearly seen from FIG. 6, which shows an opened real-world menu card as seen through the invention, overlaying virtual content on real-world printed material. The virtual content in this case is nutrition information 604 as indicated by the nutrition mode indication 601. The dish Cheese Burger is highlighted 603 as selected by the user to indicate his/her preference. The overlaid virtual content contains material such as current rating of the dish 605, nutrition information label 606, user reviews 607, among other things. In addition to these capabilities, the present invention has a social network component, where all the information mentioned can be shared among other users and customers of the restaurant, or among friends/colleagues circle, etc. In addition, the invention stores a profile of the customer's food choices and his orders in the past to suggest him/her healthy food choices whenever he visits the restaurant. The invention keeps a count on the user's caloric consumption at the restaurant on a daily, weekly, monthly or yearly basis to make this analysis.

Figure 7:
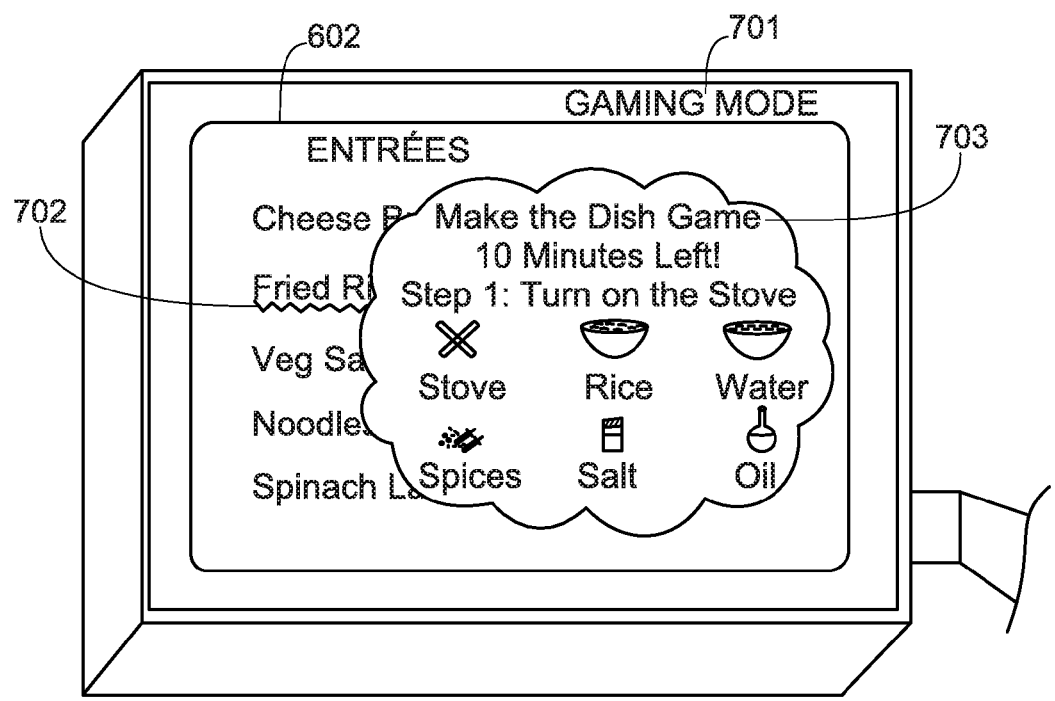
FIG. 7 shows an opened real-world menu card as seen through the invention, overlaying virtual content on real-world printed material. The virtual content in this case is a game called "Make the Dish Game."

FIG. 7 shows an opened real-world menu card as seen through the invention, overlaying virtual content on real-world printed material. The virtual content in this case is a game called "Make the Dish Game" 703 as indicated by the gaming mode indicator 701. The game pertains to the dish Fried Rice as selected 702 by the user. This game is a timed game that tells the user how much time he has left and the steps to make the dish. This game engages customers while they wait at their tables for food that they have ordered to arrive.

Figure 8:
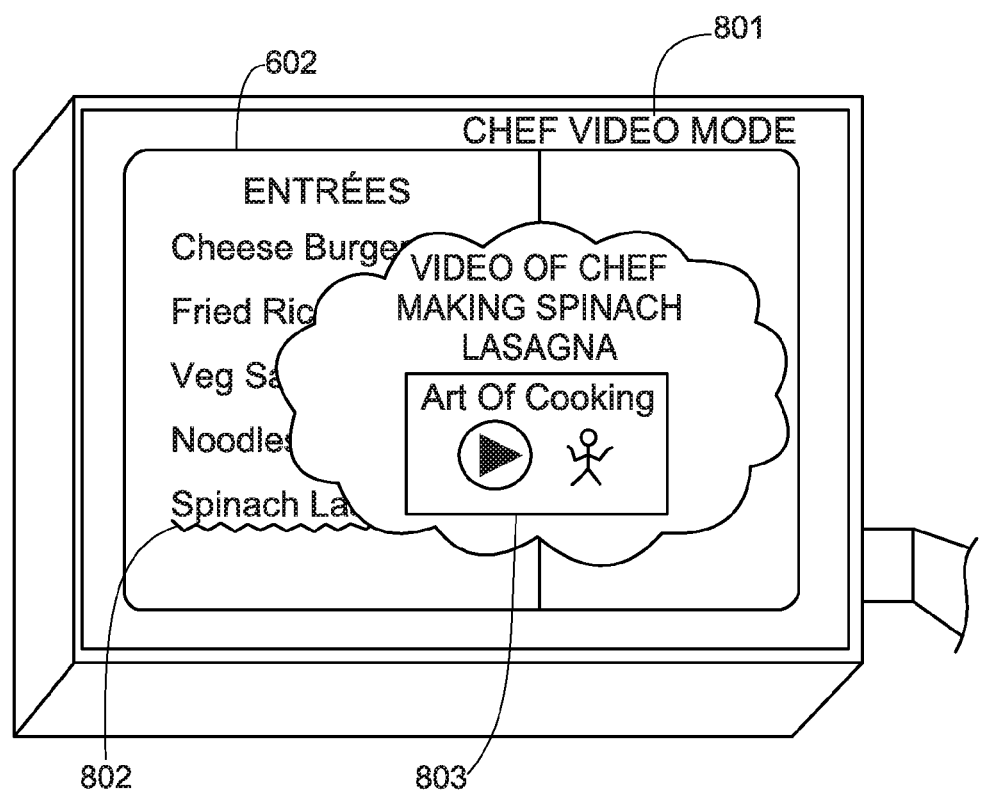
FIG. 8 shows an opened real-world menu card as seen through the invention, overlaying virtual content on real-world printed material. The virtual content in this case is a video of the chef of the restaurant making spinach lasagna.

FIG. 8 shows an opened real-world menu card as seen through the invention, overlaying virtual content on real-world printed material. The virtual content in this case is a video 803 of the chef of the restaurant making spinach lasagna 802, as indicated by the chef video mode indication 801. The invention thus informs customers about how the chef made the dish, among other information. It should be noted that this virtual content can contain any other type of video as the restaurant sees fit to show to its customers.

Figure 9:
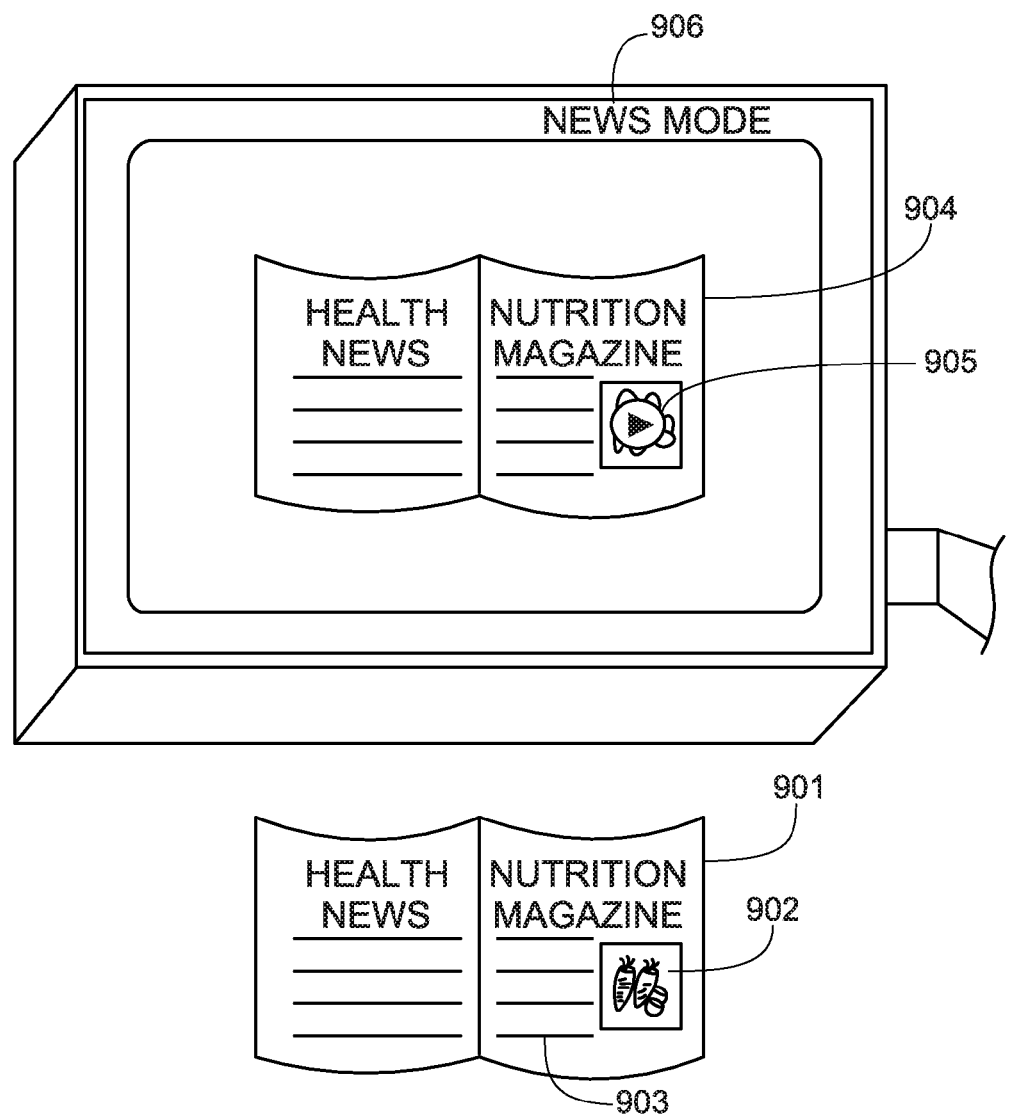
FIG. 9 shows an opened real-world health news magazine as seen through the invention, overlaying virtual content on real-world printed material. The virtual content in this case is a video suggesting tips for healthy diet.

FIG. 9 shows an opened real-world health news magazine 901 containing printed picture 902, as seen through the invention, overlaying virtual content on real-world printed material. The virtual content in this case is a video suggesting tips for healthy diet 905. The present invention thereby saves space on printed material such as paper.

Figure 10:
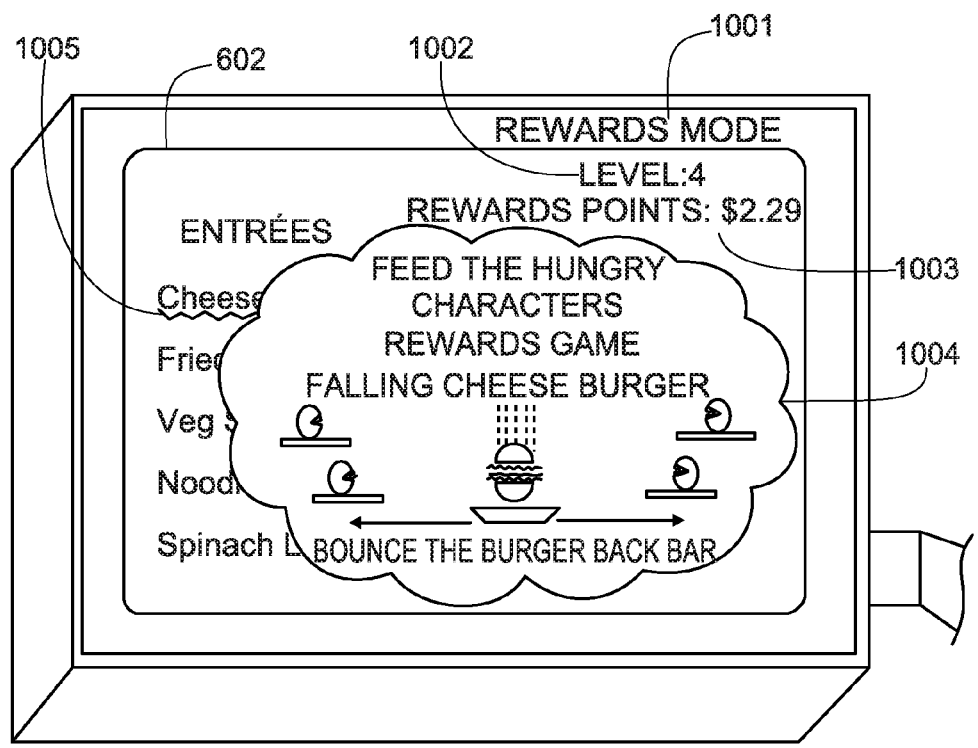
FIG. 10 shows an opened real-world menu card as seen through the invention, overlaying virtual content on real-world printed material. The virtual content in this case is a game called "Feed the Hungry Characters Rewards Game."

FIG. 10 shows an opened real-world menu card as seen through the invention, overlaying virtual content on real-world printed material. The virtual content in this case is a game called "Feed the Hungry Characters Rewards Game" 1004, as indicated by the rewards mode indication 1001. The level being played 1002, and the reward points accumulated 1003 are indicated by the invention. This game is played with the cheese burger dish as selected 1005 by the user. This is a rewards game with persistent user performance scores 1 game state stored on remote servers. So the users/customers of the restaurant can continue to accumulate reward points on the game on subsequent visits to the restaurant. These reward points are redeemable towards free food, thereby increasing the incentive for customers to regularly visit and spend time at the restaurant, playing this game.

Figure 11:
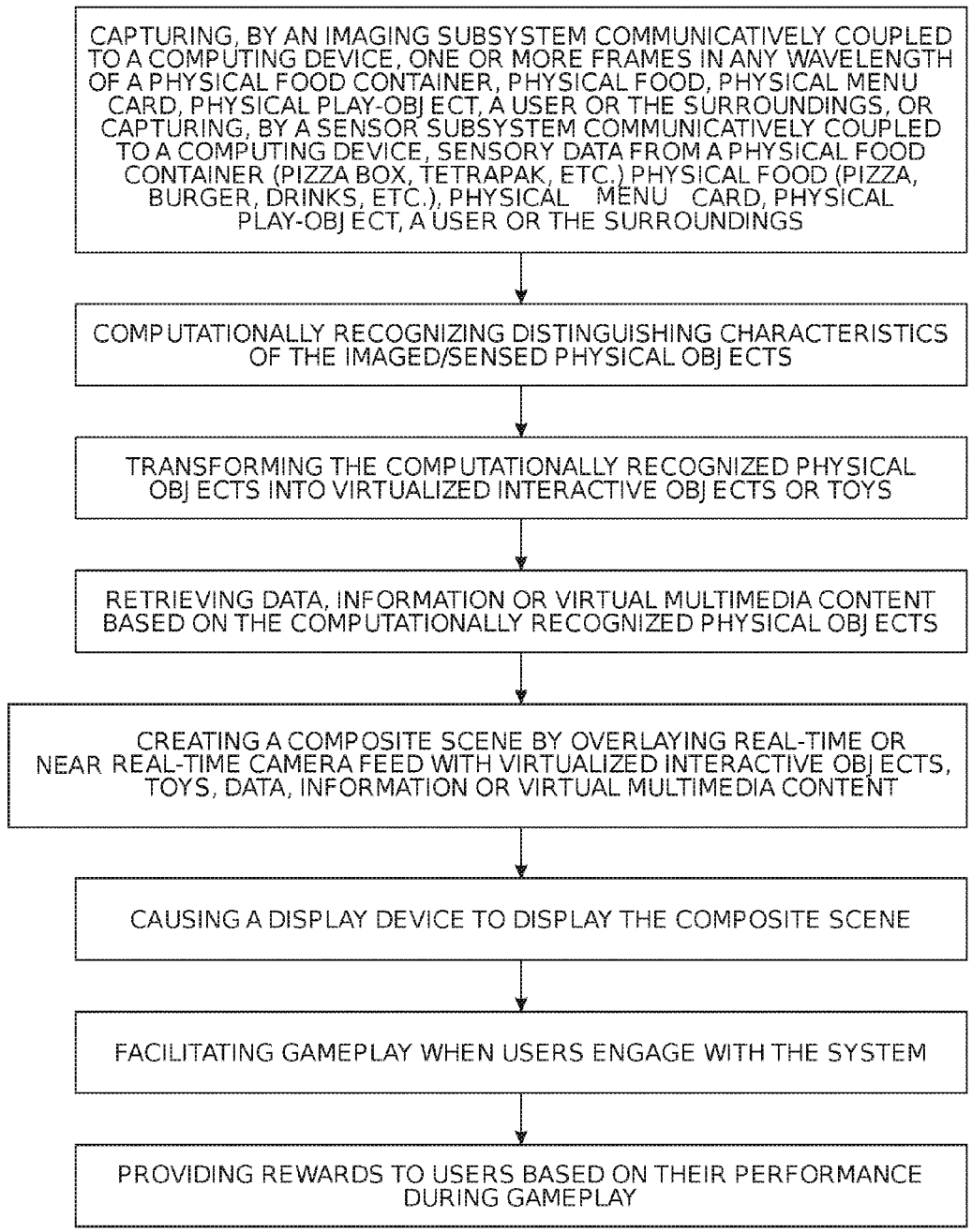
FIG. 11 illustrates, according to some aspects of the present disclosure, the playground gameplay facilitation process using physical food containers, physical food, menu cards, users or physical play-objects.

FIG. 11 illustrates, according to some aspects of the present disclosure, the playground gameplay facilitation process using physical food containers, physical food, menu cards, users or physical play-objects. In cases where a user chooses to not play a game, the system triggers another desired process upon computationally recognizing the distinguishing characteristics of the physical objects, such as providing the user with relevant information, or assisting the user to perform a desired task.

The present invention can be deployed in the usecase scenarios such as those mentioned below. It should be kept in mind that these are not the only usecases but two such sample usecases of the present invention.

(i) Dine-in restaurant/coffee shop/icecream parlor/etc: Because the rewards game is so engaging, has so many levels, the scores 1 game state are persistently stored on remote servers, and this game can only be played using the restaurant's menu card within restaurant premises, users will want to go back to the same restaurant that offers this experience over and over again to continue their progress in the game.

(ii) Pizza phone-order/delivery business: For the pizza phone-order/delivery business, the pizza box replaces the menu card as the infotainment platform. Unlike the dine-in experience, for the pizza business, the present invention allows users to use one pizza box for only one level. After a user finishes a level, the invention stores the user's scores/game state on its servers and asks the user to continue enjoying the game the next time he orders pizza. Performance points on the pizza business rewards game are redeemable towards pizza discounts/free toppings.

Once customers/users get used to the infotainment experience provided by the present invention at a specific restaurant, they won't settle for anything less at other restaurants. The present invention keeps all the stakeholders happy. Customers are happy since they (i) get quality gaming experience (younger segment of the population) (ii) get rich multimedia information consumption experience that enables them to make healthy food and diet choices and lead healthy lives (adult segment of the population) (iii) get to save money (reward points redeemable towards free food), among other benefits. Restaurant owners are happy since the present invention helps drive restaurant service volume, acts as a serious differentiator, saves precious property real estate (obviating the need to install physical hardware such as swings, slides, etc for providing playing entertainment), saves paper real estate (printing space on menu cards, etc), among other benefits.

Those of ordinary skill will understand and appreciate the existence of variations, combinations, equivalents, usecases, of the specific embodiment, methods and examples herein. The invention should therefore not be limited by the above described embodiment, method, and examples, but by all embodiments, methods, examples and usecases in the scope and spirit of the invention as claimed.

According to some aspects of the present disclosure, the present invention provides a rich multimedia infotainment platform for restaurants, catering businesses, service businesses, entertainment businesses, infotainment businesses, etc., the invention comprising: tables or other containing objects; real-world objects typically found in, but not limited to, restaurants such as menu cards, pizza boxes, etc; real-world objects typically found in, but not limited to, restaurants such plates, glasses, salt shakers, pepper shakers, napkin dispensers, spoons, forks, brochures, newspapers, magazines, flyers, wall-hangings, etc.; computing devices with video and other sensory data processing units, where the computing devices are typically, but not limited to, mobile devices, cellphones, smartphones, tablet computers, portable computers, handheld computing devices, standalone computing devices, wearable computing devices, etc.; cameras or other mechanisms of data capture such as sensors connected to the computing devices; mechanisms to recognize real-world objects, events, etc from the captured data; remote servers with processing and storage capabilities, containing multimedia contents such as video, audio, graphics, graphical characters in 2-dimension or 3-dimension, animation, text, hyperlinks, etc, connected to the computing devices over a network, from where virtual contents are retrieved, depending on the context; local storage devices connected to the computing devices for storing data; and display mechanisms connected to the computing devices for displaying the retrieved virtual multimedia contents.

According to some aspects of the present disclosure, the present invention transforms restaurant tables or other containing objects into a virtual playground for infotainment with real-world objects on the restaurant tables such as menu cards, salt shakers, pepper shakers, napkin dispensers, spoons, forks, brochures, newspapers, magazines, etc, virtualized and overlaid with other virtual multimedia content such as video, audio, graphics, graphical characters in 2-dimension or 3-dimension, animation, text, hyperlinks, etc that can be interacted with for the purposes of playing a game or for information consumption, where the multimedia contents are retrieved over the network from remote servers or local storage connected to scanning devices, where the scanning devices are typically, but not limited to, mobile devices, cellphones, smartphones, tablet computers, portable computers, handheld computing devices, standalone computing devices, wearable computing devices, etc, equipped with cameras or other mechanisms of data capture.

The restaurant can be, but not limited to, a dine-in restaurant, coffee shop, icecream parlor, snacks stall, bakery, any catering business, etc.

The table is either the table that customers dine on, or any other table or other containing objects allocated by the restaurant or other business for deploying the invention.

The real-world objects that are scanned, virtualized and multimedia content overlaid, can be located anywhere, not necessarily on a restaurant table or other containing object, perhaps in a different setting, perhaps held in hand, inside or outside a restaurant depending on the usecase and deployment scenario.

The invention deployment scenario depends on the usecase, including, but not limited to, spas, service businesses, entertainment businesses, infotainment businesses, etc.

According to some aspects of the present disclosure, the present invention overlays a restaurant's real-world printed or handwritten menu card, in cases of dine-in restaurants, catering businesses, service businesses, etc, or overlays a real-world pizza box or any other printed or handwritten or hand-drawn material or other real-world object used by the pizza delivery business or any other phone order delivery business, as the platform for deploying the invention, with virtual multimedia content such as video, audio, graphics, graphical characters in 2-dimension or 3-dimension, animation, text, hyperlinks, etc that can be interacted with for the purposes of playing a game or for information consumption, where the overlaid contents that are retrieved over the network from remote servers or local storage, pertain to dish nutrition information, user reviews, user ratings, diet tips, customer food consumption history/pattern, health suggestions, new offerings, health and nutrition games, other games, cookery videos, tips, information, or any other content of interest to the users or the entities deploying the invention for the benefit of the users.

The invention also gives the users the ability to personalize and save such multimedia contents, progress on the games, or consumption patterns on remote storage, cloud storage, or the like.

The invention also gives the users the ability to share such contents through the network or other means among other users/customers of the infotainment platform.

The invention also gives the users the ability to play with/against, or consume content together with, other users/customers of the infotainment platform at the same time.

The invention also gives the invention deploying entities, such as the dine-in restaurants, catering businesses, service businesses, etc, the ability to activate a location lock capability using Global Positioning System or other locating mechanisms, if the deploying entities so desire, to control and regulate the locations the users/customers of the infotainment platform can use the infotainment platform, thereby incentivizing users/customers to return to the restaurant or the deploying entities' premises to continue using the infotainment platform, besides deterring users/customers from stealing the restaurant's menu card or other objects belonging to the restaurant for the sake of using the infotainment platform.

The invention also gives the invention deploying entities, such as the pizza delivery business or any other phone order delivery business, the ability to control and regulate the number of times or the duration of use of the infotainment platform by the users/customers for each order they place, thereby incentivizing users/customers of the phone-order and delivery businesses to place more orders with the deploying entities/businesses to increase their service volume.

The invention also rewards customers/users for their loyalty to the infotainment platform and the entities deploying the infotainment platform invention, by tying user usage behavior/performance on the infotainment platform to reward points that can be redeemed towards free food/food discounts or coupons or other items of interest to the users of the infotainment platform or the entities deploying the infotainment platform invention.

According to some aspects of the present disclosure, the present invention transforms real-world materials/objects such as newspapers, magazines, books, flyers, brochures, documents, event invitation cards, receipts, tickets, calendars, photo albums, wall hangings, etc, containing printed or handwritten or embedded or such typically inanimate text, photographs, images, photographs, pictures, drawings, abstract patterns, alphanumeric codes, etc into a virtual information delivery platform by overlaying virtual multimedia content such as video, audio, graphics, graphical characters in 2-dimension or 3-dimension, animation, text, hyperlinks, etc that can be interacted with for the purposes of playing a game or for information consumption, where the overlaid contents that are retrieved over the network from remote servers or local storage, pertain to, but not limited to, current events/happenings, news bulletin, editorials, stories, documentaries, press coverages, subject matter details, lectures, speeches, seminars, discussions, debates, information snippets, updates, games, sports, movies, health, entertainment, personal information, personal messages, greetings, etc or any other content of interest to the users/customers consuming the multimedia content or the entities deploying the invention for the benefit of the users.

The invention also gives the users the ability to personalize and save such multimedia contents, progress on the games, or consumption patterns on remote storage, cloud storage, or the like.

The invention also gives the users the ability to share such contents through the network or other means among other users/customers of the infotainment platform.

The invention also gives the users the ability to play with/against, or consume content together with, other users/customers of the infotainment platform at the same time.

The invention gives the users the ability to use the infotainment platform for purposes of gaming, entertainment, and information consumption, anywhere and at any time.

The invention also rewards customers/users for their loyalty to the infotainment platform and the entities deploying the infotainment platform invention, by tying user usage behavior/performance on the infotainment platform to reward points that can be redeemed towards free food/food discounts or coupons or other items of interest to the users of the infotainment platform or the entities deploying the infotainment platform invention.

According to some aspects of the present disclosure, the present invention uses a method for providing a rich multimedia infotainment platform for restaurants, catering businesses, service businesses, entertainment businesses, infotainment businesses, etc, where the method comprises: using tables or other containing objects; using real-world objects typically found in, but not limited to, restaurants such as menu cards, pizza boxes, etc.; using real-world objects typically found in, but not limited to, restaurants such plates, glasses, salt shakers, pepper shakers, napkin dispensers, spoons, forks, brochures, newspapers, magazines, flyers, wall-hangings, etc.; using computing devices with video and other sensory data processing units, where the computing devices are typically, but not limited to, mobile devices, cellphones, smartphones, tablet computers, portable computers, handheld computing devices, standalone computing devices, wearable computing devices, etc.; capturing data through cameras or other mechanisms of data capture such as sensors connected to the computing devices; recognizing real-world objects, events, etc from the captured data, where the recognition computation takes place either locally on the computing devices, or remotely on servers with processing and storage capabilities over the network; retrieving multimedia contents such as video, audio, graphics, graphical characters in 2-dimension or 3-dimension, animation, text, hyperlinks, etc, from remote servers with processing and storage capabilities, connected to the computing devices through a network, depending on the context; storing retrieved multimedia contents on local storage devices connected to the computing devices; and displaying the retrieved virtual multimedia contents using display mechanisms connected to the computing devices.

According to some aspects of the present disclosure, the present invention uses a method that transforms restaurant tables or other containing objects into a virtual playground for infotainment with real-world objects on the restaurant tables such as menu cards, salt shakers, pepper shakers, napkin dispensers, spoons, forks, brochures, newspapers, magazines, etc, virtualized and overlaid with other virtual multimedia content such as video, audio, graphics, graphical characters in 2-dimension or 3-dimension, animation, text, hyperlinks, etc that can be interacted with for the purposes of playing a game or for information consumption, where the multimedia contents are retrieved over the network from remote servers or local storage connected to scanning devices, where the scanning devices are typically, but not limited to, mobile devices, cellphones, smartphones, tablet computers, portable computers, handheld computing devices, standalone computing devices, wearable computing devices, etc, equipped with cameras or other mechanisms of data capture.

The restaurant can be, but not limited to, a dine-in restaurant, coffee shop, ice cream parlor, snacks stall, bakery, any catering business, etc.

The table is either the table that customers dine on, or any other table or other containing objects allocated by the restaurant or other business for deploying the method.

The real-world objects that are scanned, virtualized and multimedia content overlaid, can be located anywhere, not necessarily on a restaurant table or other containing object, perhaps in a different setting, perhaps held in hand, inside or outside a restaurant depending on the usecase and deployment scenario.

The method deployment scenario depends on the usecase, including, but not limited to, spas, service businesses, entertainment businesses, infotainment businesses, etc.

According to some aspects of the present disclosure, the present invention uses a method that overlays a restaurant's real-world printed or handwritten menu card, in cases of dine-in restaurants, catering businesses, service businesses, etc, or overlays a real-world pizza box or any other printed or handwritten or hand-drawn material or other real-world object used by the pizza delivery business or any other phone order delivery business, as the platform for deploying the method, with virtual multimedia content such as video, audio, graphics, graphical characters in 2-dimension or 3-dimension, animation, text, hyperlinks, etc that can be interacted with for the purposes of playing a game or for information consumption, where the overlaid contents that are retrieved over the network from remote servers or local storage, pertain to dish nutrition information, user reviews, user ratings, diet tips, customer food consumption history/pattern, health suggestions, new offerings, health and nutrition games, other games, cookery videos, tips, information, or any other content of interest to the users or the entities deploying the method for the benefit of the users.

The method also gives the users the ability to personalize and save such multimedia contents, progress on the games, or consumption patterns on remote storage, cloud storage, or the like.

The method also gives the users the ability to share such contents through the network or other means among other users/customers of the infotainment platform.

The method also gives the users the ability to play with/against, or consume content together with, other users/customers of the infotainment platform at the same time.

The method also gives the method deploying entities, such as the dine-in restaurants, catering businesses, service businesses, etc, the ability to activate a location lock capability using Global Positioning System or other locating mechanisms, if the deploying entities so desire, to control and regulate the locations the users/customers of the infotainment platform can use the infotainment platform, thereby incentivizing users/customers to return to the restaurant or the deploying entities' premises to continue using the infotainment platform, besides deterring users/customers from stealing the restaurant's menu card or other objects belonging to the restaurant for the sake of using the infotainment platform.

The method also gives the method deploying entities, such as the pizza delivery business or any other phone order delivery business, the ability to control and regulate the number of times or the duration of use of the infotainment platform by the users/customers for each order they place, thereby incentivizing users/customers of the phone-order and delivery businesses to place more orders with the deploying entities/businesses to increase their service volume.

The method also rewards customers/users for their loyalty to the infotainment platform and the entities deploying the infotainment platform method, by tying user usage behavior/performance on the infotainment platform to reward points that can be redeemed towards free food/food discounts or coupons or other items of interest to the users of the infotainment platform or the entities deploying the infotainment platform method.

According to some aspects of the present disclosure, the present invention uses a method that transforms real-world materials/objects such as newspapers, magazines, books, flyers, brochures, documents, event invitation cards, receipts, tickets, calendars, photo albums, wall hangings, etc, containing printed or handwritten or embedded or such typically inanimate text, photographs, images, photographs, pictures, drawings, abstract patterns, alphanumeric codes, etc into a virtual information delivery platform by overlaying virtual multimedia content such as video, audio, graphics, graphical characters in 2-dimension or 3-dimension, animation, text, hyperlinks, etc that can be interacted with for the purposes of playing a game or for information consumption, where the overlaid contents that are retrieved over the network from remote servers or local storage, pertain to, but not limited to, current events/happenings, news bulletin, editorials, stories, documentaries, press coverages, subject matter details, lectures, speeches, seminars, discussions, debates, information snippets, updates, games, sports, movies, health, entertainment, personal information, personal messages, greetings, etc or any other content of interest to the users/customers consuming the multimedia content or the entities deploying the method for the benefit of the users.

The method also gives the users the ability to personalize and save such multimedia contents, progress on the games, or consumption patterns on remote storage, cloud storage, or the like.

The method also gives the users the ability to share such contents through the network or other means among other users/customers of the infotainment platform.

The method also gives the users the ability to play with/against, or consume content together with, other users/customers of the infotainment platform at the same time.

The method gives the users the ability to use the infotainment platform for purposes of gaming, entertainment, and information consumption, anywhere and at any time.

The method also rewards customers/users for their loyalty to the infotainment platform and the entities deploying the infotainment platform method, by tying user usage behavior/performance on the infotainment platform to reward points that can be redeemed towards free food/food discounts or coupons or other items of interest to the users of the infotainment platform or the entities deploying the infotainment platform method.

According to some aspects of the present disclosure, the present invention comprises: a physical food container or a physical food; a computing device including a processor and a memory; and at least one camera communicatively coupled to the computing device and configured to capture one or more frames of video of a user, the physical food container, the physical food, or the physical objects, or at least one sensor communicatively coupled to the computing device and configured to capture sensory data from a user, the physical food container, the physical food, or the physical objects.

The computing device is configured to computationally recognize distinguishing characteristics of the physical food container or the physical food based on the video captured by the at least one camera or the sensory data captured by the at least one sensor.

The system triggers an event or facilitates gameplay based on the computationally recognized physical food container or the computationally recognized physical food.

A plurality of users can either simultaneously interact or take turns—as dictated by a gameplay scenario—to interact with the food container or the food by moving them around, making them touch other physical objects, changing their relative position and/or orientation, or forming a group including the food container, the food, and other physical objects.

The system provides rewards to a user based on the user's performance during gameplay.

The system allows the user to: share information, consume content, play with or against other users, save information relating to the user's preferences, the user's usage of the system, and the user's performance during gameplay on a server or cloud storage to enable seamless pause and restart at a different location or a different time or through a different computing device.

The system: allows the user to use one unit of the physical food container or the physical food to play only one level of a game, or for a certain duration, prompts the user to place more orders to progress to the next level of the game, or to extend the duration of gameplay, or enables the user to use the rewards accumulated in the game to subsidize the user's current orders or subsequent orders.

The virtualized food container toy or the virtualized food toy is animated according to the physical properties of the physical food container or the physical food, respectively, or is animated without such constraints.

The virtualized food container toy or the virtualized food toy have the ability to sit on top of physical objects, to stand on top of physical objects, to touch physical objects, to seamlessly interact with physical objects, virtualized objects, or virtualized toys by respecting natural laws of physics governing the interaction, to listen for user commands or to take input from the user, and to respond accordingly by talking, moving, emoting, or providing information.

The virtualized food container toy or the virtualized food toy are manipulated by a user interacting with them through one or more of the following: physically interacting with the corresponding physical food container or the corresponding physical food, touching a touchscreen display of the computing device, analyzing and interpreting video of the hand movements of the user, analyzing and interpreting voice instructions of the user, analyzing and interpreting eye gaze of the user, analyzing and interpreting facial emotions of the user, or placing the physical food container or the physical food in the camera field of view for a certain amount of time or in a certain configuration.

The system stores locally or in a server, data including: a profile of the user's food preferences, the user's current orders, the user's caloric consumption pattern data, or data pertaining to the user's interaction with the system to suggest to the user healthier food choices and to provide better information whenever the user interacts with the system at a later point in time or when the user subsequently visits another restaurant or when the user subsequently interacts with the system through a different computing device.

The physical food container includes a pizza box, a cardboard food box, a paper food bag, a kids meal box, a food bag, a takeaway bag, a delivery bag, a paper food cup, a paperboard food container, a tinfoil food wrap, a hot bag, a corrugated fiberboard box, a foam food container, a molded fibre container, a plastic food container, a polythene food container, an aluminum food container, a food tray, a food can, a food carton, a food wrapper, a human hand, a containing object, a food pallet, a gunny sack, a drink box, an aseptic food container, a tetra pak, or a wax-paper food package.

The data, information, or virtual multimedia content includes text, hyperlinks, markup language, still images, audio, videos, graphics, graphical characters, 2D animation, 3D animation or games pertaining to information including the information about food, an outlet offering the food, a chef's food philosophy, the chef's resume, special dishes, pricing, offers, discounts, coupons, catering business promotions, service business promotions, entertainment business promotions, infotainment business promotions, health and nutrition information, cookery and recipe information, allergy related information, consumption regulation related information, diet tips, health tips, gastronomical tips, dining tips and information, user reviews, ratings, discussions, or comments.

The computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

The computational recognition of distinguishing characteristics of the physical food container or the physical food, the transformation of the physical food container or the physical food into the virtualized food container toy or the virtualized food toy, respectively, the transmission of data, information, or virtual multimedia content based on the computationally recognized physical food container or the computationally recognized physical food, the insertion of the data, information, or virtual multimedia content into the video camera feed as captured by the at least one camera to create a composite scene, the integration of the virtualized food container toy or the virtualized food toy corresponding to the physical food container or the physical food, respectively, into the resulting composite scene, the causing of the display device to display the composite scene, or any combination of these steps is done by the server.

The system regulates user access to modes of the system by enforcing an access lock as determined by: the physical food container or the physical food that are computationally recognized, the consumption state of the physical food that are computationally recognized, location coordinates of the user as estimated by a Global Positioning System (GPS) receiver or a locating mechanism, or user usage behavior including duration of use.

The system further comprises an input device configured to receive input from the user to control one or more processes of the computing device or a server.

The system further comprises an audio speaker to play audio.

The system further comprises an Global Positioning System (GPS) receiver to identify the location where the system is active.

According to some aspects of the present disclosure, the present invention uses a method comprising: capturing, by at least one camera communicatively coupled to a computing device, one or more frames of video, of a user, a physical food container, a physical food or the physical objects; or capturing, by at least one sensor communicatively coupled to the computing device, sensory data from a user, a physical food container, a physical food, or the physical objects; and computationally recognizing, by the computing device, distinguishing characteristics of the physical food container or the physical food based on the video captured by the at least one camera or the sensory data captured by the at least one sensor.

The method may further comprise triggering an event or facilitating gameplay based on the computationally recognized physical food container or the computationally recognized physical food.

The method may further comprise providing rewards to a user based on the user's performance during the gameplay.

According to some aspects of the present disclosure, the present invention comprises a physical restaurant menu card; a computing device including a processor and a memory; at least one camera communicatively coupled to the computing device and configured to capture one or more frames of video of a user, the physical restaurant menu card, or the physical objects; or at least one sensor communicatively coupled to the computing device and configured to capture sensory data from a user, the physical restaurant menu card, or the physical objects.

The computing device is configured to computationally recognize distinguishing characteristics of the physical restaurant menu card and understand the content of the physical restaurant menu card based on the video captured by the at least one camera or the sensory data captured by the at least one sensor.

The system triggers an event or facilitates gameplay based on the virtualized interactive restaurant menu card corresponding to the computationally recognized physical restaurant menu card and content of the computationally recognized physical restaurant menu card.

A plurality of users can either simultaneously interact or take turns—as dictated by a gameplay scenario—to interact with the virtualized interactive restaurant menu card or the physical restaurant menu card by moving it around, making it touch other physical objects, changing its relative position and/or orientation, or forming a group including the virtualized interactive restaurant menu card or the physical menu card and other physical objects.

The system provides rewards to a user based on the user's performance during gameplay.

The system allows the user to: share information, consume content, play with or against other users, save information relating to the user's preferences, the user's usage of the system, and the user's performance during gameplay on a server or cloud storage to enable seamless pause and restart at a different location or a different time or through a different computing device.

The system: allows the user to use one unit of a physical play object to play only one level of a game, or for a certain duration, prompts the user to place more orders to progress to the next level of the game, or to extend the duration of gameplay, or enables the user to use the rewards accumulated in the game to subsidize the user's current orders or subsequent orders.

The virtualized interactive restaurant menu card is animated according to the physical properties of the physical restaurant menu card and content of the physical restaurant menu card, or are animated without such constraints.

The virtualized interactive restaurant menu card has the ability to sit on top of physical objects, to stand on top of physical objects, to touch physical objects, to seamlessly interact with physical objects, virtualized objects, or virtualized object toys by respecting natural laws of physics governing the interaction, to listen for user commands or to take input from the user, and to respond accordingly by talking, moving, emoting, or providing information.

The virtualized interactive restaurant menu card is manipulated by a user interacting with it through one or more of the following: physically interacting with the corresponding physical restaurant menu card and content of the corresponding physical restaurant menu card, touching a touchscreen display of the computing device, analyzing and interpreting video of the hand movements of the user, analyzing and interpreting voice instructions of the user, analyzing and interpreting eye gaze of the user, analyzing and interpreting facial emotions of the user, or placing the physical restaurant menu card and content of the physical restaurant menu card in the camera field of view for a certain amount of time or in a certain configuration.

The system stores locally or in a server, data including: a profile of the user's food preferences, the user's current orders, the user's caloric consumption pattern data, or data pertaining to the user's interaction with the system, to suggest to the user healthier food choices and to provide better information whenever the user interacts with the system at a later point in time or when the user subsequently visits another restaurant or when the user subsequently interacts with the system through a different computing device.

The physical menu card includes a restaurant menu card, a cafeteria menu card, a pizza outlet menu card, a dessert menu card, a wine list menu card, a liquor and mixed drinks menu card, a beer list menu card, an appetizer menu card, an ice cream parlor menu card, a coffee shop menu card, a spa service outlet menu card, a catering business menu, a service business menu, an entertainment business menu, an infotainment business menu, a wall-mounted menu board, a chalkboard menu, a write-on wipe-off illuminated menu card, a lit-up sign board menu, a catalog, or a poster menu.

The data, information, or virtual multimedia content includes text, hyperlinks, markup language, still images, audio, videos, graphics, graphical characters, 2D animation, 3D animation or games pertaining to information including the information about food, an outlet offering the food, a chef's food philosophy, the chef's resume, special dishes, pricing, offers, discounts, coupons, catering business promotions, service business promotions, entertainment business promotions, infotainment business promotions, health and nutrition information, cookery and recipe information, allergy related information, consumption regulation related information, diet tips, health tips, gastronomical tips, dining tips and information, user reviews, ratings, discussions, or comments.

The computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

The computational recognition of distinguishing characteristics of the physical restaurant menu card and content of the physical restaurant menu card, the transformation of the physical restaurant menu card and content of the physical restaurant menu card into the virtualized interactive restaurant menu card, the transmission of data, information, or virtual multimedia content based on the computationally recognized physical restaurant menu card and content of the physical restaurant menu card, the insertion of the data, information, or virtual multimedia content into the video camera feed as captured by the at least one camera to create a composite scene, the integration of the virtualized interactive restaurant menu card corresponding to the physical restaurant menu card and content of the physical restaurant menu card into the resulting composite scene, the causing of the display device to display the composite scene, or any other combination of these steps is done by the server.

The system regulates user access to modes of the system by enforcing an access lock as determined by: the physical restaurant menu card and content of the physical restaurant menu card that are computationally recognized, the consumption state of a physical food in the vicinity of the physical restaurant menu card that are computationally recognized, location coordinates of the user as estimated by a Global Positioning System (GPS) receiver or a locating mechanism, or user usage behavior including duration of use.

The system further comprises an input device to receive input from the user to control one or more processes of the computing device or a server.

The system further comprises an audio speaker to play audio.

The system further comprises a Global Positioning System (GPS) receiver to identify the location where the system is active.

According to some aspects of the present disclosure, the present invention uses a method comprising: capturing, by at least one camera communicatively coupled to a computing device, one or more frames of video, of a user, a physical restaurant menu card or the physical objects; or capturing, by at least one sensor communicatively coupled to the computing device, sensory data from a user, a physical restaurant menu card, or the physical objects; and computationally recognizing, by the computing device, distinguishing characteristics of the physical restaurant menu card and understanding the content of the physical restaurant menu card based on the video captured by the at least one camera or the sensory data captured by the at least one sensor.

The method may further comprise triggering an event or facilitating gameplay based on the computationally recognized physical restaurant menu card and the content of the physical restaurant menu card.

The method may further comprise providing rewards to a user based on the user's performance during the gameplay.

According to some aspects of the present disclosure, the present invention comprises: at least one physical play-object; a computing device including a processor and a memory; at least one imaging system communicatively connected to the computing device and configured to capture one or more frames of a user, the at least one physical play-object; or at least one sensor system communicatively connected to the computing device and configured to capture sensory data from a user, the at least one physical play-object. The computing device is configured to computationally recognize distinguishing characteristics of the at least one physical play-object based on the frames captured by the at least one imaging system or the sensory data captured by the at least one sensor system.

The playground system starts a process or facilitates gameplay based on the computationally recognized at least one physical play-object.

A plurality of users can either simultaneously interact or take turns—as dictated by a gameplay scenario—to interact with the at least one play-object or an at least one virtualized game character toy by moving the at least one play-object or the at least one virtualized game character toy around, making the at least one play-object or the at least one virtualized game character toy touch at least another play-object, changing their relative position and/or orientation, or forming a set of the at least one play-object or the at least one virtualized game character toy and the at least another play-object.

The playground system provides incentives to a user based on the user's performance during gameplay.

The playground system stores locally or in a server, data including: a profile of the user's preferences, the user's current transactions, the user's consumption pattern data, or data pertaining to the user's interaction with the system to suggest to the user better gameplay choices and to provide better information whenever the user interacts with the playground system at a later point in time or when the user subsequently visits another place or when the user subsequently interacts with the playground system through a different computing device.

The playground system allows the user to: share information, consume content, play with or against other users, save information relating to the user's preferences, the user's usage of the playground system, and the user's performance on the games on a server or cloud storage to enable seamless pause and restart at a different location or a different time or through a different computing device.

The playground system: allows the user to use one unit of the physical play-object to play only one level of a game, or for a certain duration, prompts the user to conduct more transactions to progress to the next level of the game, or to extend the duration of gameplay, or enables the user to use the incentives accumulated in the game to benefit the user's current transactions or subsequent transactions.

The at least one virtualized game character toy is animated according to the physical properties of the at least one physical play-object, or are animated without such constraints.

The at least one virtualized game character toy has the ability to sit on top of physical objects, to stand on top of physical objects, to touch physical objects, to seamlessly interact with physical objects and virtualized objects by respecting natural laws of physics governing the interaction, to listen for user commands or to take input from the user, and to respond accordingly by talking, moving, emoting, or providing information.

The at least one virtualized game character toy is manipulated by a user interacting with it through one or more of the following: physically interacting with the corresponding physical play-object, touching a touchscreen display of the computing device, analyzing and interpreting video of the hand movements of the user, analyzing and interpreting voice instructions of the user, analyzing and interpreting eye gaze of the user, analyzing and interpreting facial emotions of the user, or placing the physical play-object in the camera field of view of the imaging system for a certain amount of time or in a certain configuration.

The at least one physical play-object includes tables, plates, glasses, tumblers, bottles, food, food containers, containing objects, spoons, forks, cutlery, glassware, tableware, drinkware, serving dishes, eating and kitchen utensils, bowls, cups, napkin dispensers, napkins, brochures, mugs, jugs, corkscrews, knives, beakers, sporks, chopsticks, picks, straws, salt shakers, pepper shakers, menu cards, pizza boxes, catering business objects, service business objects, entertainment business objects, infotainment business objects, objects containing printed, handwritten, embedded, inanimate text, photographs, images, pictures, drawings, abstract patterns, alphanumeric codes, catalogs, flyers, newspapers, magazines, books, documents, event invitation cards, receipts, tickets, calendars, photo albums, or wallhangings.

The data, information, or virtual multimedia content includes text, hyperlinks, markup language, still images, audio, videos, graphics, graphical characters, 2D animation, 3D animation or games pertaining to subject matter including current events and happenings, news bulletin, editorials, stories, documentaries, press coverages, subject details, lectures, speeches, seminars, discussions, debates, information snippets, updates, games, sports, movies, health, entertainment, personal information, personal messages, or greetings.

The computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

The computational recognition of distinguishing characteristics of the at least one physical play-object, the transformation of the at least one physical play-object into the virtualized game character toy, the transmission of data, information, or virtual multimedia content based on the computationally recognized at least one physical play-object, the insertion of the data, information, or virtual multimedia content into the video camera feed as captured by the at least one imaging system to create a composite scene, the integration of the virtualized game character toy corresponding to the at least one physical play-object into the resulting composite scene, the causing of the display device to display the composite scene, or any combination of these steps is done by the server.

The playground system regulates user access to modes of the playground system by enforcing an access lock as determined by: the at least one physical play-object that is computationally recognized, the consumption state of a physical food in the vicinity of the physical play-object that are computationally recognized, location coordinates of the user as estimated by a Global Positioning System (GPS) receiver or a locating mechanism, or user usage behavior including duration of use.

The playground system further comprises an input device configured to receive input from the user to control one or more processes of the computing device or a server.

The playground system further comprises an audio speaker to play audio.

The playground system further comprises a Global Positioning System (GPS) receiver to identify the location where the playground system is active.

According to some aspects of the present disclosure, the present invention uses a method comprising: capturing, by at least one imaging system communicatively connected to a computing device, one or more frames, of a user, at least one physical play-object; or capturing, by at least one sensor system communicatively connected to the computing device, sensory data from a user, at least one physical play-object; and computationally recognizing, by the computing device, distinguishing characteristics of the at least one physical play-object based on the frames captured by the at least one imaging system or the sensory data captured by the at least one sensor system.

The method may further comprise starting a process or facilitating gameplay based on the computationally recognized at least one physical play-object.

The method may further comprise providing incentives to a user based on the user's performance during the gameplay.

According to some aspects of the present disclosure, the present invention further comprises a display device communicatively coupled to the computing device and configured to display a video camera feed together with data, information, virtual multimedia content, virtualized objects or virtualized object toys.

The computing device is configured to transform the computationally recognized physical food container or the computationally recognized physical food into a virtualized food container toy or a virtualized food toy, respectively, or to transform the computationally recognized physical food container or the computationally recognized physical food into a virtualized food container or a virtualized food, respectively.

The system further comprises a server, including a processor and a memory, in communication with the computing device, wherein the server is configured to store, transmit or receive data, information, or virtual multimedia content associated with the physical food container or the physical food, wherein the computing device: retrieves data, information, or virtual multimedia content from the server or locally based on the computationally recognized physical food container or the computationally recognized physical food; inserts the retrieved data, information, or virtual multimedia content into the video camera feed as captured by the at least one camera to create a composite scene; integrates the virtualized food container toy or the virtualized food toy corresponding to the physical food container or the physical food, respectively, into the resulting composite scene; and causes the display device to display the composite scene.

According to some aspects of the present disclosure, the present invention uses a method further including, providing a display device communicatively coupled to the computing device and configured to display a video camera feed together with data, information, virtual multimedia content, virtualized objects or virtualized object toys.

The method may further include, transforming by the computing device, the computationally recognized physical food container or the computationally recognized physical food into a virtualized food container toy or a virtualized food toy, respectively, or transforming by the computing device, the computationally recognized physical food container or the computationally recognized physical food into a virtualized food container or a virtualized food, respectively.

The method may further include providing a server, including a processor and a memory, in communication with the computing device, wherein the server is configured to store, transmit or receive data, information, or virtual multimedia content associated with the physical food container or the physical food; retrieving, by the computing device, data, information, or virtual multimedia content locally or from the server based on the computationally recognized physical food container or the computationally recognized physical food; inserting, by the computing device, the retrieved data, information, or virtual multimedia content into the video camera feed as captured by the at least one camera to create a composite scene; integrating, by the computing device, the virtualized food container toy or the virtualized food toy corresponding to the physical food container or the physical food, respectively, into the resulting composite scene; and causing, by the computing device, the display device to display the composite scene.

The computational recognition of distinguishing characteristics of the physical food container or the physical food, the transformation of the physical food container or the physical food into the virtualized food container toy or the virtualized food toy, respectively, the transmission of data, information, or virtual multimedia content based on the computationally recognized physical food container or the computationally recognized physical food, the insertion of the data, information, or virtual multimedia content into the video camera feed as captured by the at least one camera to create a composite scene, the integration of the virtualized food container toy or the virtualized food toy corresponding to the physical food container or the physical food, respectively, into the resulting composite scene, the causing of the display device to display the composite scene, or any combination of these steps is done by the server.

According to some aspects of the present disclosure, the present invention, further comprises a display device communicatively coupled to the computing device and configured to display a video camera feed together with data, information, virtual multimedia content, virtualized objects or virtualized object toys.

The computing device is configured to transform the computationally recognized physical restaurant menu card and the content of the computationally recognized physical restaurant menu card into a virtualized interactive restaurant menu card.

The system may further comprise a server, including a processor and a memory, in communication with the computing device, wherein the server is configured to store, transmit or receive data, information, or virtual multimedia content associated with the physical restaurant menu card and the content of the physical restaurant menu card, wherein the computing device: retrieves data, information, or virtual multimedia content from the server or locally based on the computationally recognized physical restaurant menu card and content of the computationally recognized physical restaurant menu card; inserts the retrieved data, information, or virtual multimedia content into the video camera feed as captured by the at least one camera to create a composite scene; integrates the virtualized interactive restaurant menu card corresponding to the physical restaurant menu card into the resulting composite scene; and causes the display device to display the composite scene.

According to some aspects of the present disclosure, the present invention uses a method further including, providing a display device communicatively coupled to the computing device and configured to display a video camera feed together with data, information, virtual multimedia content, virtualized objects or virtualized object toys.

The method further includes transforming by the computing device, the computationally recognized physical restaurant menu card into a virtualized interactive restaurant menu card.

The method further includes providing a server, including a processor and a memory, in communication with the computing device, wherein the server is configured to store, transmit or receive data, information, or virtual multimedia content associated with the physical restaurant menu card and the content of the physical restaurant menu card; retrieving, by the computing device, data, information, or virtual multimedia content locally or from the server based on the computationally recognized physical restaurant menu card and the content of the computationally recognized physical restaurant menu card; inserting, by the computing device, the retrieved data, information, or virtual multimedia content into the video camera feed as captured by the at least one camera to create a composite scene; integrating, by the computing device, virtualized interactive restaurant menu card corresponding to the physical restaurant menu card and the content of the physical restaurant menu card, respectively, into the resulting composite scene; and causing, by the computing device, the display device to display the composite scene.

The computational recognition of distinguishing characteristics of the physical restaurant menu card and understanding of the content of the physical restaurant menu card, the transformation of the physical restaurant menu card into the virtualized interactive restaurant menu card, the transmission of data, information, or virtual multimedia content based on the computationally recognized physical restaurant menu card and the content of the physical restaurant menu card, the insertion of the data, information, or virtual multimedia content into the video camera feed as captured by the at least one camera to create a composite scene, the integration of the virtualized interactive restaurant menu card corresponding to the physical restaurant menu card and the content of the physical restaurant menu card into the resulting composite scene, the causing of the display device to display the composite scene, or any combination of these steps is done by the server.

According to some aspects of the present disclosure, the present invention further comprises a display device communicatively connected to the computing device and configured to display a video camera feed together with data, information, virtual multimedia content, virtualized objects or virtualized object toys.

The computing device is configured to transform the computationally recognized at least one physical play-object into a virtualized game character toy.

The system further comprises a server, including a processor and a memory, in communication with the computing device, wherein the server is configured to store, transmit or receive data, information, or virtual multimedia content associated with the at least one physical play-object, wherein the computing device: retrieves data, information, or virtual multimedia content from the server or locally based on the computationally recognized at least one physical play-object; inserts the retrieved data, information, or virtual multimedia content into the video camera feed as captured by the at least one imaging system to create a composite scene; integrates the virtualized game character toy corresponding to the at least one physical play-object into the resulting composite scene; and causes the display device to display the composite scene.

According to some aspects of the present disclosure, the present invention uses a method, further including, providing a display device communicatively connected to the computing device and configured to display a video camera feed together with data, information, virtual multimedia content, virtualized objects or virtualized object toys.

The method may further include transforming by the computing device, the computationally recognized at least one physical play-object into a virtualized game character toy.

The method may further include providing a server, including a processor and a memory, in communication with the computing device, wherein the server is configured to store, transmit or receive data, information, or virtual multimedia content associated with the at least one physical play-object; retrieving, by the computing device, data, information, or virtual multimedia content locally or from the server based on the computationally recognized at least one physical play-object; inserting, by the computing device, the retrieved data, information, or virtual multimedia content into the video camera feed as captured by the at least one imaging system to create a composite scene; integrating, by the computing device, the virtualized game character toy corresponding to the at least one physical play-object into the resulting composite scene; and causing, by the computing device, the display device to display the composite scene.

The computational recognition of distinguishing characteristics of the at least one physical play-object, the transformation of the at least one physical play-object into the virtualized game character toy, the transmission of data, information, or virtual multimedia content based on the computationally recognized at least one physical play-object, the insertion of the data, information, or virtual multimedia content into the video camera feed as captured by the at least one imaging system to create a composite scene, the integration of the virtualized game character toy corresponding to the at least one physical play-object into the resulting composite scene, the causing of the display device to display the composite scene, or any combination of these steps is done by the server.

The invention claimed is:

1. A system comprising:
   a physical food container or a physical food;
   a computing device including a processor and a memory;
   at least one camera communicatively coupled to the computing device and configured to capture one or more frames of video of the physical food container, the physical food, or physical objects, or at least one sensor communicatively coupled to the computing device and configured to capture sensory data from the physical food container, the physical food, or the physical objects;
   a server, including a processor and a memory, in communication with the computing device, wherein the server is configured to store, transmit, or receive data, information, or virtual multimedia content associated with the physical food container or the physical food; and
   a display device communicatively coupled to the computing device and configured to display a video camera feed together with data, information, virtual multimedia content, virtualized objects, or virtualized object toys,
   wherein the processor of the computing device or the server is configured to computationally recognize distinguishing characteristics of the physical food container or the physical food based on the video captured by the at least one camera or the sensory data captured by the at least one sensor,
   wherein the processor of the computing device or the server is configured to transform the computationally recognized physical food container or the computationally recognized physical food into a virtualized food container toy or a virtualized food toy, respectively, or to transform the computationally recognized physical food container or the computationally recognized physical food into a virtualized food container or a virtualized food, respectively, and
   wherein the computing device:
     retrieves data, information, or virtual multimedia content from the server or locally based on the computationally recognized physical food container or the computationally recognized physical food;
     inserts the retrieved data, information, virtual multimedia content, virtualized objects, or virtualized object toys into the video camera feed as captured by the at least one camera to create a composite scene;
     integrates the virtualized food container toy or the virtualized food toy corresponding to the physical food container or the physical food, respectively, into a resulting composite scene; and
     causes the display device to display the composite scene.

2. The system of claim 1, wherein the system triggers an event or facilitates gameplay based on the computationally recognized physical food container or the computationally recognized physical food.

3. The system of claim 2, wherein a plurality of users can either simultaneously interact or take turns—as dictated by a gameplay scenario—to interact with the food container or the food by moving them around, making them touch other physical objects, changing their relative position and/or orientation, or forming a group including the food container, the food, and other physical objects.

4. The system of claim 2, wherein the system provides rewards to a user based on the user's performance during gameplay.

5. The system of claim 4, wherein the system allows the user to: share information, consume content, play with or against other users, save information relating to the user's preferences, the user's usage of the system, and the user's performance during gameplay on a server or cloud storage to enable seamless pause and restart at a different location or a different time or through a different computing device.

6. The system of claim 4, wherein the system:
allows the user to use one unit of the physical food container or the physical food to play only one level of a game, or for a certain duration,
prompts the user to place more orders to progress to the next level of the game, or to extend a duration of gameplay, or
enables the user to use the rewards accumulated in the game to subsidize the user's current orders or subsequent orders.

7. The system of claim 1, wherein the virtualized food container toy or the virtualized food toy is animated according to physical properties of the physical food container or the physical food, respectively, or is animated without such constraints.

8. The system of claim 1, wherein the virtualized food container toy or the virtualized food toy have an ability to sit on top of physical objects, to stand on top of physical objects, to touch physical objects, to seamlessly interact with physical objects, virtualized objects, or virtualized toys by respecting natural laws of physics governing the interaction, to listen for user commands or to take input from the user, and to respond accordingly by talking, moving, emoting, or providing information.

9. The system of claim 1, wherein the processor of the computing device or the server is further configured to analyze and interpret a user's physical interaction with the corresponding physical food container or the corresponding physical food, analyze and interpret the user's touching of a touchscreen display of the computing device, analyze and interpret video of hand movements of the user, analyze and interpret voice instructions of the user, analyze and interpret eye gaze of the user, analyze and interpret facial emotions of the user, or analyze and interpret the placement of the physical food container or the physical food in a camera field of view for a certain amount of time or in a certain configuration.

10. The system of claim 1, wherein the system stores locally or in a server, data including:
a profile of the user's food preferences,
the user's current orders,
the user's caloric consumption pattern data, or
data pertaining to the user's interaction with the system
to suggest to the user healthier food choices and to provide better information whenever the user interacts with the system at a later point in time or when the user subsequently visits another restaurant or when the user subsequently interacts with the system through a different computing device.

11. The system of claim 1, wherein the physical food container includes a pizza box, a cardboard food box, a paper food bag, a kids meal box, a food bag, a takeaway bag, a delivery bag, a paper food cup, a paperboard food container, a tinfoil food wrap, a hot bag, a corrugated fiberboard box, a foam food container, a molded fibre container, a plastic food container, a polythene food container, an aluminum food container, a food tray, a food can, a food carton, a food wrapper, a human hand, a containing object, a food pallet, a gunny sack, a drink box, an aseptic food container, a tetra pak, or a wax-paper food package.

12. The system of claim 1, wherein the data, information, or virtual multimedia content includes text, hyperlinks, markup language, still images, audio, videos, graphics, graphical characters, 2D animation, 3D animation or games pertaining to information including the information about food, an outlet offering the food, a chef's food philosophy, the chef's resume, special dishes, pricing, offers, discounts, coupons, catering business promotions, service business promotions, entertainment business promotions, infotainment business promotions, health and nutrition information, cookery and recipe information, allergy related information, consumption regulation related information, diet tips, health tips, gastronomical tips, dining tips and information, user reviews, ratings, discussions, or comments.

13. The system of claim 1, wherein the computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

14. The system of claim 1, wherein the computational recognition of distinguishing characteristics of the physical food container or the physical food, the transformation of the physical food container or the physical food into the virtualized food container toy or the virtualized food toy, respectively, the transmission of data, information, or virtual multimedia content based on the computationally recognized physical food container or the computationally recognized physical food, the insertion of the data, information, or virtual multimedia content into the video camera feed as captured by the at least one camera to create a composite scene, the integration of the virtualized food container toy or the virtualized food toy corresponding to the physical food container or the physical food, respectively, into the resulting composite scene, the causing of the display device to display the composite scene, or any combination of these steps is done by the server.

15. The system of claim 1, wherein the system regulates user access to modes of the system by enforcing an access lock based on:
the physical food container or the physical food that are computationally recognized,
location coordinates of the user as estimated by a Global Positioning System (GPS) receiver or a locating mechanism, or
user usage behavior including duration of use.

16. The system of claim 1, further comprising an input device configured to receive input from the user to control one or more processes of the computing device or a server.

17. The system of claim 1, further comprising an audio speaker to play audio.

18. The system of claim 1, further comprising a Global Positioning System (GPS) receiver to identify a location where the system is active.

19. A method comprising:
capturing, by at least one camera communicatively coupled to a computing device, one or more frames of video of a physical food container, a physical food, or physical objects, or capturing, by at least one sensor communicatively coupled to the computing device, sensory data from a physical food container, a physical food, or the physical objects;
providing a server, including a processor and a memory, in communication with the computing device, wherein the server is configured to store, transmit, or receive data, information, or virtual multimedia content associated with the physical food container or the physical food;
providing a display device communicatively coupled to the computing device and configured to display a video camera feed together with data, information, virtual multimedia content, virtualized objects, or virtualized object toys;

computationally recognizing, by the computing device, distinguishing characteristics of the physical food container or the physical food based on the video captured by the at least one camera or the sensory data captured by the at least one sensor;

transforming, by the computing device, the computationally recognized physical food container or the computationally recognized physical food into a virtualized food container toy or a virtualized food toy, respectively, or transforming, by the computing device, the computationally recognized physical food container or the computationally recognized physical food into a virtualized food container or a virtualized food, respectively;

retrieving, by the computing device, data, information, or virtual multimedia content locally or from the server based on the computationally recognized physical food container or the computationally recognized physical food;

inserting, by the computing device, the retrieved data, information, or virtual multimedia content into the video camera feed as captured by the at least one camera to create a composite scene;

integrating, by the computing device, the virtualized food container toy or the virtualized food toy corresponding to the physical food container or the physical food, respectively, into a resulting composite scene; and causing, by the computing device, the display device to display the composite scene.

20. The method of claim 19, wherein the computational recognition of distinguishing characteristics of the physical food container or the physical food, the transformation of the physical food container or the physical food into the virtualized food container toy or the virtualized food toy, respectively, the transmission of data, information, or virtual multimedia content based on the computationally recognized physical food container or the computationally recognized physical food, the insertion of the data, information, or virtual multimedia content into the video camera feed as captured by the at least one camera to create a composite scene, the integration of the virtualized food container toy or the virtualized food toy corresponding to the physical food container or the physical food, respectively, into the resulting composite scene, the causing of the display device to display the composite scene, or any combination of these steps is done by the server.

21. The method of claim 19, further comprising triggering an event or facilitating gameplay based on the computationally recognized physical food container or the computationally recognized physical food.

22. The method of claim 21, further comprising providing rewards to a user based on the user's performance during the gameplay.

23. A system comprising:
a physical restaurant menu card;
a computing device including a processor and a memory;
at least one camera communicatively coupled to the computing device and configured to capture one or more frames of video of a physical restaurant menu card or a physical object, or at least one sensor communicatively coupled to the computing device and configured to capture sensory data from the physical restaurant menu card or the physical object;

a server, including a processor and a memory, in communication with the computing device, wherein the server is configured to store, transmit, or receive data, information, or virtual multimedia content associated with the physical restaurant menu card and the content of the physical restaurant menu card; and a display device communicatively coupled to the computing device and configured to display a video camera feed together with data, information, virtual multimedia content, virtualized objects, or virtualized object toys, wherein the computing device is configured to computationally recognize distinguishing characteristics of the physical restaurant menu card and understand the content of the physical restaurant menu card based on the video captured by the at least one camera or the sensory data captured by the at least one sensor, wherein the computing device is configured to transform the computationally recognized physical restaurant menu card and the content of the computationally recognized physical restaurant menu card into a virtualized interactive restaurant menu card, and wherein the computing device:
retrieves data, information, or virtual multimedia content from the server or locally based on the computationally recognized physical restaurant menu card and content of the computationally recognized physical restaurant menu card;
inserts the retrieved data, information, or virtual multimedia content into the video camera feed as captured by the at least one camera to create a composite scene;
integrates the virtualized interactive restaurant menu card corresponding to the physical restaurant menu card into a resulting composite scene; and
causes the display device to display the composite scene.

24. The system of claim 23, wherein the system triggers an event or facilitates gameplay based on the virtualized interactive restaurant menu card corresponding to the computationally recognized physical restaurant menu card and content of the computationally recognized physical restaurant menu card.

25. The system of claim 24, wherein a plurality of users can either simultaneously interact or take turns—as dictated by a gameplay scenario—to interact with the virtualized interactive restaurant menu card or the physical restaurant menu card by moving it around, making it touch other physical objects, changing its relative position and/or orientation, or forming a group including the virtualized interactive restaurant menu card or the physical menu card and other physical objects.

26. The system of claim 24, wherein the system provides rewards to a user based on the user's performance during gameplay.

27. The system of claim 26, wherein the system allows the user to: share information, consume content, play with or against other users, save information relating to the user's preferences, the user's usage of the system, and the user's performance during gameplay on a server or cloud storage to enable seamless pause and restart at a different location or a different time or through a different computing device.

28. The system of claim 26, wherein the system:
allows the user to use one unit of a physical play object to play only one level of a game, or for a certain duration, prompts the user to place more orders to progress to the next level of the game, or to extend a duration of gameplay, or enables the user to use the rewards accumulated in the game to subsidize the user's current orders or subsequent orders.

29. The system of claim 23, wherein the virtualized interactive restaurant menu card is animated according to physical properties of the physical restaurant menu card and content of the physical restaurant menu card, or are animated without such constraints.

30. The system of claim 23, wherein the virtualized interactive restaurant menu card has an ability to sit on top of physical objects, to stand on top of physical objects, to touch physical objects, to seamlessly interact with physical objects, virtualized objects, or virtualized object toys by respecting natural laws of physics governing the interaction, to listen for user commands or to take input from the user, and to respond accordingly by talking, moving, emoting, or providing information.

31. The system of claim 23, wherein the computing device is further configured to analyze and interpret a user's physical interaction with the corresponding physical restaurant menu card and content of the corresponding physical restaurant menu card, analyze and interpret the user's touching of a touchscreen display of the computing device, analyze and interpret video of hand movements of the user, analyze and interpret voice instructions of the user, analyze and interpret eye gaze of the user, analyze and interpret facial emotions of the user, or analyze and interpret the placement of the physical restaurant menu card and content of the physical restaurant menu card in a camera field of view for a certain amount of time or in a certain configuration.

32. The system of claim 23, wherein the system stores locally or in a server, data including:

a profile of the user's food preferences, the user's current orders, the user's caloric consumption pattern data, or data pertaining to the user's interaction with the system, to suggest to the user healthier food choices and to provide better information whenever the user interacts with the system at a later point in time or when the user subsequently visits another restaurant or when the user subsequently interacts with the system through a different computing device.

33. The system of claim 23, wherein the physical menu card includes a restaurant menu card, a cafeteria menu card, a pizza outlet menu card, a dessert menu card, a wine list menu card, a liquor and mixed drinks menu card, a beer list menu card, an appetizer menu card, an ice cream parlor menu card, a coffee shop menu card, a spa service outlet menu card, a catering business menu, a service business menu, an entertainment business menu, an infotainment business menu, a wall-mounted menu board, a chalkboard menu, a write-on wipe-off illuminated menu card, a lit-up sign board menu, a catalog, or a poster menu.

34. The system of claim 23, wherein the data, information, or virtual multimedia content includes text, hyperlinks, markup language, still images, audio, videos, graphics, graphical characters, 2D animation, 3D animation or games pertaining to information including the information about food, an outlet offering the food, a chef's food philosophy, the chef's resume, special dishes, pricing, offers, discounts, coupons, catering business promotions, service business promotions, entertainment business promotions, infotainment business promotions, health and nutrition information, cookery and recipe information, allergy related information, consumption regulation related information, diet tips, health tips, gastronomical tips, dining tips and information, user reviews, ratings, discussions, or comments.

35. The system of claim 23, wherein the computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

36. The system of claim 23, wherein the computational recognition of distinguishing characteristics of the physical restaurant menu card and content of the physical restaurant menu card, the transformation of the physical restaurant menu card into the virtualized interactive restaurant menu card and content of the physical restaurant menu card, the transmission of data, information, or virtual multimedia content based on the computationally recognized physical restaurant menu card and content of the physical restaurant menu card, the insertion of the data, information, or virtual multimedia content into the video camera feed as captured by the at least one camera to create a composite scene, the integration of the virtualized interactive restaurant menu card corresponding to the physical restaurant menu card and content of the physical restaurant menu card into the resulting composite scene, the causing of the display device to display the composite scene, or any other combination of these steps is done by the server.

37. The system of claim 23, wherein the system regulates user access to modes of the system by enforcing an access lock based on:

the physical restaurant menu card and content of the physical restaurant menu card that are computationally recognized, location coordinates of the user as estimated by a Global Positioning System (GPS) receiver or a locating mechanism, or user usage behavior including duration of use.

38. The system of claim 23, further comprising an input device to receive input from the user to control one or more processes of the computing device or a server.

39. The system of claim 23, further comprising an audio speaker to play audio.

40. The system of claim 23, further comprising a Global Positioning System (GPS) receiver to identify a location where the system is active.

41. A method comprising:

capturing, by at least one camera communicatively coupled to a computing device, one or more frames of video of a physical restaurant menu card or a physical object, or capturing, by at least one sensor communicatively coupled to the computing device, sensory data from a physical restaurant menu card or the physical object;

providing a server, including a processor and a memory, in communication with the computing device, wherein the server is configured to store, transmit, or receive data, information, or virtual multimedia content associated with the physical restaurant menu card and the content of the physical restaurant menu card;

providing a display device communicatively coupled to the computing device and configured to display a video camera feed together with data, information, virtual multimedia content, virtualized objects, or virtualized object toys;

computationally recognizing, by the computing device, distinguishing characteristics of the physical restaurant menu card and understanding the content of the physical restaurant menu card based on the video captured by the at least one camera or the sensory data captured by the at least one sensor;

transforming, by the computing device, the computationally recognized physical restaurant menu card into a virtualized interactive restaurant menu card;

retrieving, by the computing device, data, information, or virtual multimedia content locally or from the server based on the computationally recognized physical restaurant menu card and the content of the computationally recognized physical restaurant menu card;

inserting, by the computing device, the retrieved data, information, or virtual multimedia content into the video camera feed as captured by the at least one camera to create a composite scene;

integrating, by the computing device, the virtualized interactive restaurant menu card corresponding to the physical restaurant menu card and the content of the physical restaurant menu card, respectively, into a resulting composite scene; and causing, by the computing device, the display device to display the composite scene.

42. The method of claim 41, further comprising triggering an event or facilitating gameplay based on the computationally recognized physical restaurant menu card.

43. The method of claim 42, further comprising providing rewards to a user based on the user's performance during the gameplay.

44. The method of claim 41, wherein the computational recognition of distinguishing characteristics of the physical restaurant menu card and understanding of the content of the physical restaurant menu card, the transformation of the physical restaurant menu card into the virtualized interactive restaurant menu card, the transmission of data, information, or virtual multimedia content based on the computationally recognized physical restaurant menu card and the content of the physical restaurant menu card, the insertion of the data, information, or virtual multimedia content into the video camera feed as captured by the at least one camera to create a composite scene, the integration of the virtualized interactive restaurant menu card corresponding to the physical restaurant menu card and the content of the physical restaurant menu card into the resulting composite scene, the causing of the display device to display the composite scene, or any combination of these steps is done by the server.

45. A playground system comprising:
   at least one physical play-object;
   a computing device including a processor and a memory;
   at least one imaging system communicatively connected to the computing device and configured to capture one or more frames of the at least one physical play-object, or at least one sensor system communicatively connected to the computing device and configured to capture sensory data from the at least one physical play-object;
   at least another computing system, including a processor and a memory, in communication with the computing device, wherein the at least another computing system is configured to store, transmit, or receive data, information, or virtual multimedia content associated with the at least one physical play-object; and
   a display device communicatively connected to the computing device and configured to display a video camera feed together with data, information, virtual multimedia content, virtualized objects, or virtualized object toys,
   wherein the computing device is configured to computationally recognize distinguishing characteristics of the at least one physical play-object based on the frames captured by the at least one imaging system or the sensory data captured by the at least one sensor system,
   wherein the computing device is configured to transform the computationally recognized at least one physical play-object into a virtualized game character toy, and
   wherein the computing device:
      retrieves data, information, or virtual multimedia content from the at least another computing system or locally based on the computationally recognized at least one physical play-object;
      inserts the retrieved data, information, or virtual multimedia content into the video camera feed as captured by the at least one imaging system to create a composite scene;
      integrates the virtualized game character toy corresponding to the at least one physical play-object into a resulting composite scene; and
      causes the display device to display the composite scene.

46. The playground system of claim 45, wherein the playground system starts a process or facilitates gameplay based on the computationally recognized at least one physical play-object.

47. The playground system of claim 46, wherein a plurality of users can either simultaneously interact or take turns—as dictated by a gameplay scenario—to interact with the at least one play-object or the at least one virtualized game character toy by moving the at least one play-object or the at least one virtualized game character toy around, making the at least one play-object or the at least one virtualized game character toy touch at least another play-object, changing their relative position and/or orientation, or forming a group of the at least one play-object or the at least one virtualized game character toy and the at least another play-object.

48. The playground system of claim 46, wherein the playground system provides incentives to a user based on the user's performance during gameplay.

49. The playground system of claim 45, wherein the playground system stores locally or in at least another computing system, data including:
   a profile of the user's preferences,
   the user's current transactions,
   the user's consumption pattern data, or
   data pertaining to the user's interaction with the system
   to suggest to the user better gameplay choices and to provide better information whenever the user interacts with the playground system at a later point in time or when the user subsequently visits another place or when the user subsequently interacts with the playground system through a different computing device.

50. The playground system of claim 48, wherein the playground system allows the user to: share information, consume content, play with or against other users, save information relating to the user's preferences, the user's usage of the playground system, and the user's performance on the games on at least another computing system or cloud storage to enable seamless pause and restart at a different location or a different time or through a different computing device.

51. The playground system of claim 48, wherein the playground system:
  allows the user to use one unit of the at least one physical play-object to play only one level of a game, or for a certain duration,
  prompts the user to conduct more transactions to progress to the next level of the game, or to extend a duration of gameplay, or
  enables the user to use the incentives accumulated in the game to benefit the user's current transactions or subsequent transactions.

52. The playground system of claim 45, wherein the at least one virtualized game character toy is animated according to physical properties of the at least one physical play-object, or are animated without such constraints.

53. The playground system of claim 45, wherein the at least one virtualized game character toy has an ability to sit on top of physical objects, to stand on top of physical objects, to touch physical objects, to seamlessly interact with physical objects and virtualized objects by respecting natural laws of physics governing the interaction, to listen for user commands or to take input from the user, and to respond accordingly by talking, moving, emoting, or providing information.

54. The playground system of claim 45, wherein the at least one virtualized game character toy is manipulated by a user interacting with it through one or more of the following: physically interacting with the corresponding physical play-object, touching a touchscreen display of the computing device, analyzing and interpreting video of hand movements of the user, analyzing and interpreting voice instructions of the user, analyzing and interpreting eye gaze of the user, analyzing and interpreting facial emotions of the user, or placing the physical play-object in a camera field of view of the imaging system for a certain amount of time or in a certain configuration.

55. The playground system of claim 45, wherein the at least one physical play-object includes tables, plates, glasses, tumblers, bottles, food, food containers, containing objects, spoons, forks, cutlery, glassware, tableware, drinkware, serving dishes, eating and kitchen utensils, bowls, cups, napkin dispensers, napkins, brochures, mugs, jugs, corkscrews, knives, beakers, sporks, chopsticks, picks, straws, salt shakers, pepper shakers, menu cards, pizza boxes, catering business objects, service business objects, entertainment business objects, infotainment business objects, objects containing printed, handwritten, embedded, inanimate text, photographs, images, pictures, drawings, abstract patterns, alphanumeric codes, catalogs, flyers, newspapers, magazines, books, documents, event invitation cards, receipts, tickets, calendars, photo albums, or wall-hangings.

56. The playground system of claim 45, wherein the data, information, or virtual multimedia content includes text, hyperlinks, markup language, still images, audio, videos, graphics, graphical characters, 2D animation, 3D animation or games pertaining to subject matter including current events and happenings, news bulletin, editorials, stories, documentaries, press coverages, subject details, lectures, speeches, seminars, discussions, debates, information snippets, updates, games, sports, movies, health, entertainment, personal information, personal messages, or greetings.

57. The playground system of claim 45, wherein the computing device is a mobile device, a communication device, an entertainment device, a consumer electronics device, a cellphone, a smartphone, a tablet computer, a portable computer, a smart device, a television, a radio, a music player, a video player, a gaming console, a digital camera, a handheld computing device, a standalone computing device, or a wearable computing device.

58. The playground system of claim 45, wherein the computational recognition of distinguishing characteristics of the at least one physical play-object, the transformation of the at least one physical play-object into the virtualized game character toy, the transmission of data, information, or virtual multimedia content based on the computationally recognized at least one physical play-object, the insertion of the data, information, or virtual multimedia content into the video camera feed as captured by the at least one imaging system to create a composite scene, the integration of the virtualized game character toy corresponding to the at least one physical play-object into the resulting composite scene, the causing of the display device to display the composite scene, or any combination of these steps is done by the at least another computing system.

59. The playground system of claim 45, wherein the playground system regulates user access to modes of the playground system by enforcing an access lock based on:
  the at least one physical play-object that is computationally recognized,
  location coordinates of the user as estimated by a Global Positioning System (GPS) receiver or a locating mechanism, or
  user usage behavior including duration of use.

60. The playground system of claim 45, further comprising an input device configured to receive input from the user to control one or more processes of the computing device or at least another computing system.

61. The playground system of claim 45, further comprising an audio speaker to play audio.

62. The playground system of claim 45, further comprising a Global Positioning System (GPS) receiver to identify a location where the playground system is active.

63. A method comprising:
  capturing, by at least one imaging system communicatively connected to a computing device, one or more frames of at least one physical play-object, or capturing, by at least one sensor system communicatively connected to the computing device, sensory data from the at least one physical play-object;
  providing at least another computing system, including a processor and a memory, in communication with the computing device, wherein the at least another computing system is configured to store, transmit, or receive data, information, or virtual multimedia content associated with the at least one physical play-object;
  providing a display device communicatively connected to the computing device and configured to display a video camera feed together with data, information, virtual multimedia content, virtualized objects, or virtualized object toys;
  computationally recognizing, by the computing device, distinguishing characteristics of the at least one physical play-object based on the frames captured by the at least one imaging system or the sensory data captured by the at least one sensor system;
  transforming, by the computing device, the computationally recognized at least one physical play-object into a virtualized game character toy;
  retrieving, by the computing device, data, information, or virtual multimedia content locally or from the at least another computing system based on the computationally recognized at least one physical play-object;

inserting, by the computing device, the retrieved data, information, or virtual multimedia content into the video camera feed as captured by the at least one imaging system to create a composite scene;

integrating, by the computing device, the virtualized game character toy corresponding to the at least one physical play-object into a resulting composite scene; and causing, by the computing device, the display device to display the composite scene.

64. The method of claim 63, further comprising starting a process or facilitating gameplay based on the computationally recognized at least one physical play-object.

65. The method of claim 64, further comprising providing incentives to a user based on the user's performance during the gameplay.

66. The method of claim 63, wherein the computational recognition of distinguishing characteristics of the at least one physical play-object, the transformation of the at least one physical play-object into the virtualized game character toy, the transmission of data, information, or virtual multimedia content based on the computationally recognized at least one physical play-object, the insertion of the data, information, or virtual multimedia content into the video camera feed as captured by the at least one imaging system to create a composite scene, the integration of the virtualized game character toy corresponding to the at least one physical play-object into the resulting composite scene, the causing of the display device to display the composite scene, or any combination of these steps is done by the at least another computing system.

* * * * *